US012732883B2

(12) United States Patent
Li et al.

(10) Patent No.: US 12,732,883 B2
(45) Date of Patent: Sep. 8, 2026

(54) USER EQUIPMENT TRAJECTORY-ASSISTED HANDOVER

(71) Applicant: Intel Corporation, Santa Clara, CA (US)

(72) Inventors: Ziyi Li, Beijing (CN); Dawei Ying, Portland, OR (US); Qian Li, Portland, OR (US); Youn Hyoung Heo, Santa Clara, CA (US); Jaemin Han, Santa Clara, CA (US); Zongrui Ding, Portland, OR (US); Maruti Gupta Hyde, Santa Clara, CA (US); Yi Zhang, San Jose, CA (US); Sudeep Palat, Cheltenham (GB); Yi Guo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 18/556,421

(22) PCT Filed: Aug. 4, 2022

(86) PCT No.: PCT/US2022/039441
§ 371 (c)(1),
(2) Date: Oct. 20, 2023

(87) PCT Pub. No.: WO2023/014896
PCT Pub. Date: Feb. 9, 2023

(65) Prior Publication Data

US 2024/0205781 A1 Jun. 20, 2024

Related U.S. Application Data

(60) Provisional application No. 63/236,456, filed on Aug. 24, 2021, provisional application No. 63/270,445, filed on Oct. 21, 2021.

(30) Foreign Application Priority Data

Aug. 5, 2021 (WO) ................ PCT/CN2021/110778

(51) Int. Cl.
*H04W 36/32* (2009.01)
*H04W 36/00* (2009.01)
*H04W 36/36* (2009.01)

(52) U.S. Cl.
CPC ..... *H04W 36/322* (2023.05); *H04W 36/0058* (2018.08); *H04W 36/362* (2023.05)

(58) Field of Classification Search
CPC ............ H04W 36/22; H04W 36/0058; H04W 36/362; H04W 36/322
See application file for complete search history.

(56) References Cited

U.S. PATENT DOCUMENTS

2010/0069070 A1 3/2010 Shi et al.
2019/0223073 A1 7/2019 Chen et al.
(Continued)

FOREIGN PATENT DOCUMENTS

WO 2020/168321 A1 8/2020
WO 2021/032280 A1 2/2021

OTHER PUBLICATIONS

International Patent Office—International Search Report and Written Opinion mailed xx from International Patent Application No. PCT/US2022/039441, 10 pages.
(Continued)

*Primary Examiner* — Curtis B Odom
(74) *Attorney, Agent, or Firm* — Schwegman Lundberg & Woessner, P.A.

(57) ABSTRACT

Systems, apparatuses, methods, and computer-readable media are provided for user equipment (UE) trajectory-assisted handovers. In particular, some embodiments may
(Continued)

1900

Receiving, from a next-generation NodeB (gNB), a request for location information for a user equipment (UE)
1905

Determining, using a positioning artificial intelligence (AI) or machine learning (ML) model, the location information for the UE based on UE measurement report information and the request for location information wherein the location information for the UE includes an indication of a predicted location for the UE
1910

Encoding a message for transmission to the gNB that includes an indication of the determined location information for the UE
1915 include artificial intelligence (AI) or machine learning (ML) to predict UE location information. Other embodiments may be described and/or claimed.

21 Claims, 20 Drawing Sheets

(56) References Cited

U.S. PATENT DOCUMENTS

2020/0107282 A1* 4/2020 Segev .................. H04J 11/0073
2024/0007988 A1* 1/2024 Sundararajan ........ G01S 5/0273

OTHER PUBLICATIONS

Huawei, et al., "Discussion on remaining issues for CHO in NTN," 3GPP TSG RAN WG2 #114-e, R2-2105613 (revision of R2-2103632), Agenda Item: 8.10.3.3, May 19-May 27, 2021, Electronic Meeting, 6 pages.
Huawei, "Further discussions on AI/ML assisted load balancing," 3GPP TSG-RAN WG3 Meeting #112-e, R3-212524, Agenda item: 18.3, May 17-27, 2021, E-meeting, 5 pages.
"Remaining Issues of LTE Conditional Handover", 3GPP Draft R2-1905948 [Online]. Retrieved from the Internet URL http www.3gpp.org ftp Meetings%5F3GPP%5FSYNC RAN2 Docs R2%2D1905948%2Ezip, May 13, 2019, 4 pgs.
"European Application Serial No. 22853917.7, Extended European Search Report mailed May 27, 2025", 12 pgs.

* cited by examiner

Figure 18:
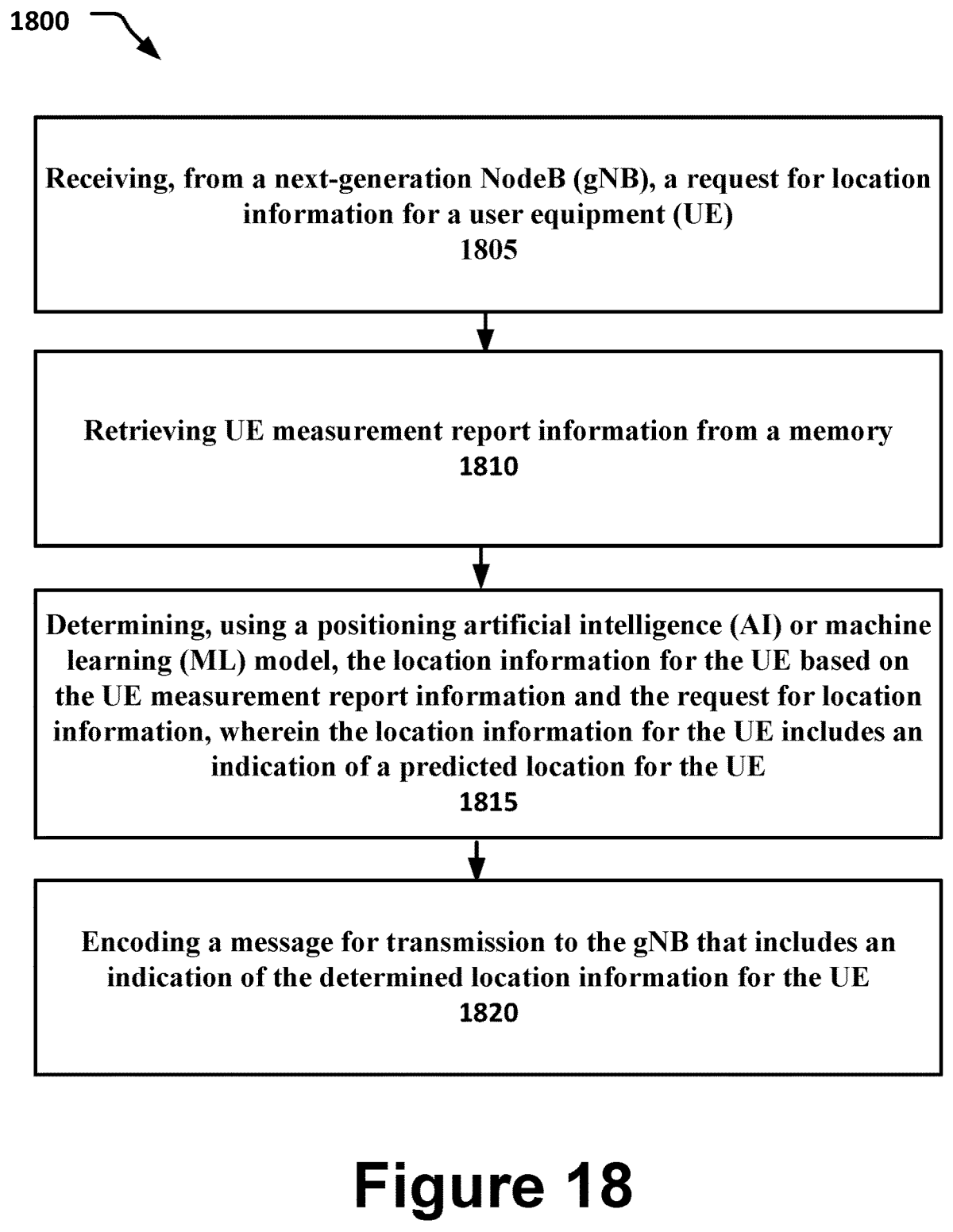

1800

Receiving, from a next-generation NodeB (gNB), a request for location information for a user equipment (UE)
1805

Retrieving UE measurement report information from a memory
1810

Determining, using a positioning artificial intelligence (AI) or machine learning (ML) model, the location information for the UE based on the UE measurement report information and the request for location information, wherein the location information for the UE includes an indication of a predicted location for the UE
1815

Encoding a message for transmission to the gNB that includes an indication of the determined location information for the UE
1820

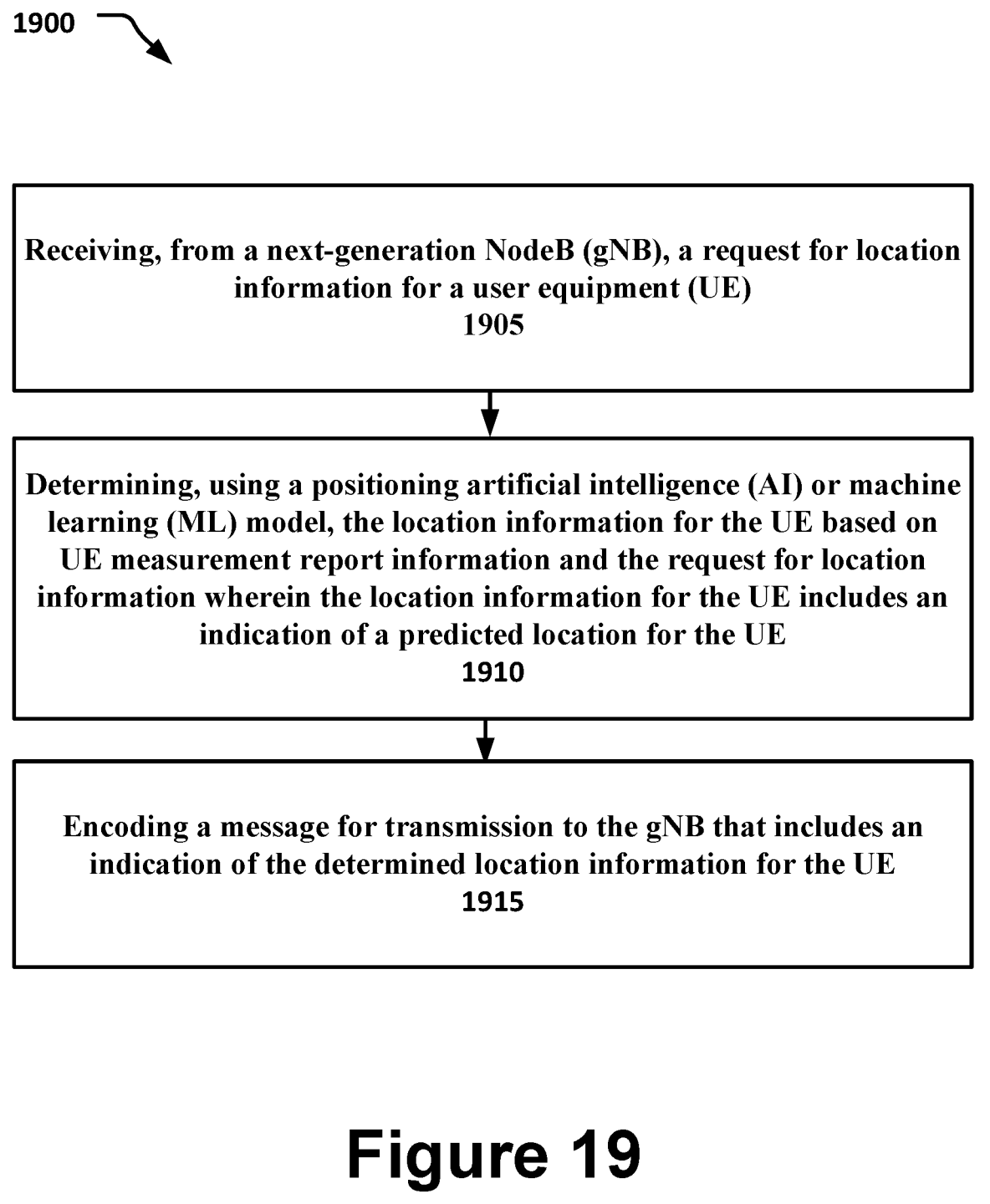

Receiving, from a next-generation NodeB (gNB), a request for location information for a user equipment (UE)
1905

Determining, using a positioning artificial intelligence (AI) or machine learning (ML) model, the location information for the UE based on UE measurement report information and the request for location information wherein the location information for the UE includes an indication of a predicted location for the UE
1910

Encoding a message for transmission to the gNB that includes an indication of the determined location information for the UE
1915

Figure 19

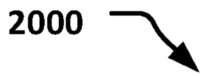

Encoding, for transmission to a network function, a request for location information for a user equipment (UE)
2005

Receiving, from the network function, the location information for the UE, wherein the location information for the UE includes an indication of a predicted location for the UE
2010

Determining configuration information that includes an indication of a combination of candidate handover cells and respective priorities for the candidate handover cells
2015

Encoding, for transmission to the UE, a message that includes the configuration information
2020

Figure 20

USER EQUIPMENT TRAJECTORY-ASSISTED HANDOVER

CROSS REFERENCE TO RELATED APPLICATIONS

The present application is a national phase entry under 35 U.S.C. § 371 of International Application No. PCT/US2022/039441, which was filed Aug. 4, 2022, which claims priority to International Application No. PCT/CN2021/110778, which was filed Aug. 5, 2021; U.S. Provisional Patent Application No. 63/236,456, which was filed Aug. 24, 2021; and to U.S. Provisional Patent Application No. 63/270,445, which was filed Oct. 21, 2021, the entire disclosures of which are hereby incorporated by reference.

FIELD

Various embodiments generally may relate to the field of wireless communications. For example, some embodiments may relate to user equipment (UE) trajectory-assisted handovers. In particular, some embodiments may include artificial intelligence (AI) or machine learning (ML) to predict UE location information.

BACKGROUND

There is currently standardization activity in 3GPP RAN3 studying mobility optimization that can be enhanced using artificial intelligence/machine learning (AI/ML) techniques. The motivation is to guarantee service continuity during mobility by minimizing call drops, radio link failures (RLFs), unnecessary handovers, ping-pong events, etc., especially when a user equipment (UE) is moving at high-speed or when the UE is frequently performing handover procedures across different target nodes. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 18, 19, and 20 depict examples of procedures for practicing the various embodiments discussed herein.

DETAILED DESCRIPTION

Figure 1:
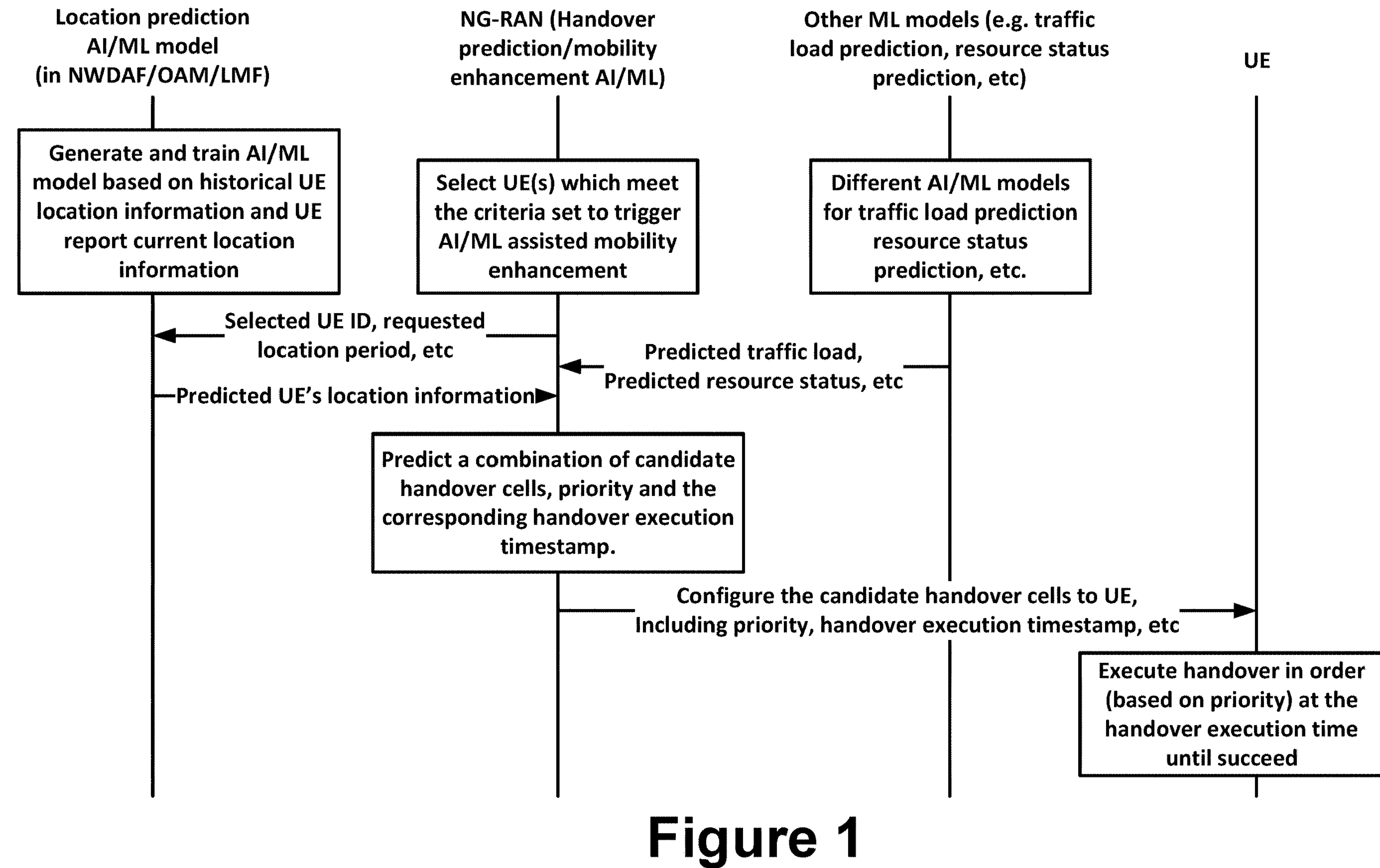
FIG. 1 is a flowchart illustrating an example of a process in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As introduced above, there is currently standardization activity in 3GPP RAN3 studying mobility optimization that can be enhanced using AI/ML techniques. The legacy approach supported in 3GPP SON is to collect feedback (e.g., ping-pong event, failure rate, etc.) so that the operation administration and maintenance (OAM) system can continuously optimize handover strategy based on failure events. However, it is very challenging and costly to develop an optimal handover scheme based on trial-and-error methodology.

3GPP SA5 studied mobility management related issues as a use case in TR 28.809, v. 17.0.0, 2021 Apr. 6, where mobility optimization can be based on resource consumption, inter-gNB beam selection, load balancing, mobility performance, UE trajectory or UE load. It is noticed that the UE location information is provided by the Location Services (LCS), where the location server is resident in the CN. The MDA (management data analytics) function block is responsible for providing ML training and inference service. The use of AI strategies for handover optimization is gaining attention and has also been proposed. However, it is based upon UE's historical record of location information and requires processing a very large amount of information regarding the UE's previous history using its location and can be quite intrusive in terms of UE privacy. This is because the methods require the data to be collected within a single central location where the UE's location information is combined to create various possible trajectories to find the optimal target cells. Given that currently, it is difficult to track UEs across different cells, this means UE's location information is somehow tagged along with UE's ID, which can be highly intrusive and having it present in a single central location presents a security risk. Furthermore, past record while indicative cannot be fully trusted to make the right prediction on which target cell to pick if the UE's route is not the same this time.

In addition, the handover strategy at the OAM level may be generic and cannot adaptively make real-time handover decision based on each UE's information. To further help optimize handover mechanism for a specific UE, it is essential to optimize mobility management at the RAN level as well.

Instead of tracking a UE's long-term history of location info, a more near-term update on the UE's existing location and trajectory information can greatly help to improve the accuracy and predict the target cell, especially in case of the high-speed mobile UEs. In logged MDT, location information is reported by the UE to the MDT analytics function as a series of location coordinates as deduced through prior Handovers and some historical UE location data. Hence, by knowing the future location of UE (either report from UE or predicted by the network) can further improve the handover successful rate.

Various embodiments herein are directed to an AI/ML assisted handover mechanism located at NG-RAN, where the future UE location is used for mobility enhancement. The future UE location may be determined from: 1) UE reported future UE location information 2) current/future positioning information available at the LMF (location management function)/OAM/CN.

Moreover, in some embodiments, the network may select the suitable UE(s) to use AI/ML model for handover decision, based on 1) UE information 2) mobility events 3) UE device type/environment.

The described mechanism improves the UE handover success rate with assistance from machine learning-based methods to predict the target cell that has the greatest handover success probability based on the UE's future/near-term location and its trajectory, which can further reduce service interruption at the UE side and reduce network overhead. Since the UE shares the info with the gNB only for the short-term rather than the entire journey, it's easier to preserve UE privacy as a more comprehensive view of UE's location history is not needed to predict the target cell information.

The described mechanism also reduces AI/ML workload for highly active UEs in the network by only selecting the UE(s) which can benefit from AI/ML the most (e.g. better output accuracy, better performance improvement, etc).

Embodiment 1: LMF Predict Location/Positioning-Based Mobility Handover

In this embodiment, mobility handover decision is based on the assistance of LMF provided location information. Following the positioning procedure, NG-RAN will send measurement report to the LMF, which computes the location of the UE. Based on the stored measurement reports, LMF can predict the UE location information. Based on the predicted result of UE location and UE trajectory, NG-RAN can optimize the target cell selection and predict the best timing for certain UE to handover, together with UE's load, handover event collection, etc.

The positioning AI/ML model is trained and inferenced at the LMF, while the predicted results are sent to RAN over NRPPa or NG interface. The predicted location can also be received from MDA or NWDAF located in OAM or CN, respectively.

Input of the AI-positioning assisted mobility enhancement includes:

- Predicted location information of UE (based on UE's current speed/location/trajectory info)
- (predicted) load of UE
- Target cell current/predicted resource status
- Current/predicted resource status of its own Output of the AI-positioning assisted mobility enhancement includes:

- Whether the UE should start handover?
- the list of target cells with priority and the timing of handover
  - if UE should handover to another target cell within a threshold of timing, the network will configure the UE to handover to target cell, together with the best time to perform handover.
  - the network can also configure this outcome "the group of target cells and the corresponding handover timing, priority" to the UE as CHO (conditional handover) candidate cell(s), the corresponding configuration are sent as conditional handover configuration. The UE can execute CHO configuration and handover to the candidate target cell according to the configured handover execution timing. With the timestamp, UE can stop performing measurements to evaluate conditional execution condition. The CHO execution condition need to be enhanced.
  - The source gNB should also transfer the corresponding predicted handover timing to the candidate target gNB, where Xn interface should be enhanced.
  - UE selects the target cell to handover according to the priority. If handover is fails, UE will continue to select the remaining target cell which has the highest priority until the handover procedure succeeds. If execution timing of candidate cell(s) expires during UE performs handover, UE can delete this candidate cell from the list.
- Predicted configuration or load information To help the target cell make better decision on the resource allocation, when UE is going to handover to the target cell, the source cell can also send the predicted configuration for the UE based on historical behavior or predicted load information to the target cell. An example of message flows is shown in the flowchart in FIG. 1.

To support the prediction location information transfer, the NRPPa or NG can be enhanced. The input data are collected from RAN or based on measurement reports. The output data are transmitted from CN or LMF to RAN.

NG-RAN sends a predict location request to OAM (e.g. MDA)/CN (e.g. NWDAF/AMF)/LMF, the request can include duration of requested location (e.g. start time stamp+end time stamp/start time stamp+duration), request location information (relative location, latitude, longitude, altitude, etc), UE ID, etc.

LMF/OAM/CN sends the predicted results to NG-RAN, including the requested location information, accuracy of the output, etc.

Further to support candidate cell configuration, the CHO configuration can also be enhanced. The timing of each candidate cell can be added in the configuration.

An example embodiment with enhancement to the CondReconfigToAddModList IE is shown as below. Changes are marked in underline.

Example 1: An indication "attemptPredictCondReconfig" is used to indicate UE whether it can use the predicted timing for handover configured by the source cell or not.

| CondReconfigToAddModList information element |
|---|
| -- ASN1START<br>-- TAG-CONDRECONFIGTOADDMODLIST-START<br>CondReconfigToAddModList-r16 ::= SEQUENCE (SIZE (1.. maxNrofCondCells-r16)) OF CondReconfigToAddMod-r16<br>CondReconfigToAddMod-r16 ::= SEQUENCE {<br>condReconfigId-r16 CondReconfigId-r16,<br>condExecutionCond-r16 SEQUENCE (SIZE (1..2)) OF MeasId OPTIONAL, -- Cond condReconfigAdd<br>condRRCReconfig-r16 OCTET STRING (CONTAINING RRCReconfiguration) OPTIONAL, -- Cond condReconfigAdd<br>condExecutionTime-rxy8 INTEGER (0..5119) OPTIONAL, --Need N<br>condExecutionPriority-rxy INTEGER (1.. maxNrofCondCell-r16) OPTIONAL --Need N<br>...<br>}<br>-- TAG-CONDRECONFIGTOADDMODLIST-STOP<br>-- ASN1STOP |

| condExecutionTime |
|---|
| Indicates the relative time since the UE received the CondReconfig message. It indicates when the UE should handover to this candidate cell. If the time expires, the UE should not remove the candidate cell from the list. |
| condExecutionPriority |
| Indicates the priority of candidate cell. The UE selects target cell for handover from the candidate cell with highest priority. If handover failed, the UE continues to select handover target cell according to the priority until handover succeed. |

Example 2. Alternatively, CondTriggerConfig can also be considered as an enhancement for this prediction-based trigger event. An example embodiment with enhancement is shown as below.

ReportConfigNR information element

```
CondTriggerConfig-r16 ::= SEQUENCE {
  condEventId CHOICE {
    condEventA3 SEQUENCE {
      a3-Offset MeasTriggerQuantityOffset,
      hysteresis Hysteresis,
      timeToTrigger TimeToTrigger
    },
    condEventA5 SEQUENCE {
```

-continued

ReportConfigNR information element

```
      a5-Threshold1 MeasTriggerQuantity,
      a5-Threshold2 MeasTriggerQuantity,
      hysteresis Hysteresis,
      timeToTrigger TimeToTrigger
    },
    CondEventPredict SEQUENCE {
      timeToTrigger TimeToTrigger
    },
    ...
  },
  rsType-r16 NR-RS-Type,
  ...
}
```

| timeToTrigger |
|---|
| Time during of CondEventPredict is the specific criteria for the event to trigger in order to execute the UE handover. |

To support the predicted configuration or load information transfer, the Xn interface (HANDOVER REQUEST) can be enhanced.

An example embodiment with enhancement is shown as below. Changes are marked in underline.

HANDOVER REQUEST ACKNOWLEDGE

| IE/Group Name | Presence | Range | IE type and reference | Semantics description | Criticality | Assigned Criticality |
|---|---|---|---|---|---|---|
| . . . | . . . | . . . | . . . | . . . | . . . | . . . |
| **Conditional Handover Information Acknowledge** | O | | | | O | YES |
| >Requested Target Cell ID | M | | Target Cell Global ID | Target cell indicated in the corresponding HANDOVER REQUEST message | — | |
| >Maximum Number of CHO Preparations | O | | 9.2.3.101 | | | |

-continued

| HANDOVER REQUEST ACKNOWLEDGE | | | | | | |
|---|---|---|---|---|---|---|
| IE/Group Name | Presence | Range | IE type and reference | Semantics description | Criticality | Assigned Criticality |
| >ExecutionTimeStamp | O | | | | Y | ignore |
| **Predict Information Acknowledge** | | | | | | |
| Load information | O | | | | Y | ignore |
| Location information | O | | | | Y | ignore |

Embodiment 2: UE Based Location/Positioning-Based Mobility Handover

In this embodiment, mobility handover decision is based on the assistance of UE reported current and near-term location information. The handover target cell(s) are predicted based on the joint AI/ML model optimization for load information, UE assistance location information, handover event and configuration selection, etc.

To support this functionality, the LocationInfo can be enhanced to include the following location information, reporting from UE to the network:

near-term/future Latitude, longitude (mandatory);
near-term/future Velocity (mandatory);
near-term/future Altitude (conditional on availability);
near-term/future Uncertainty (conditional on availability);
near-term/future Confidence (conditional on availability);
near-term/future Direction (conditional on availability).
near-term/future Timestamp (mandatory)

This could be a location information list which includes the future/predicted locations corresponding to the multiple time points in the near-term.

Figure 2:
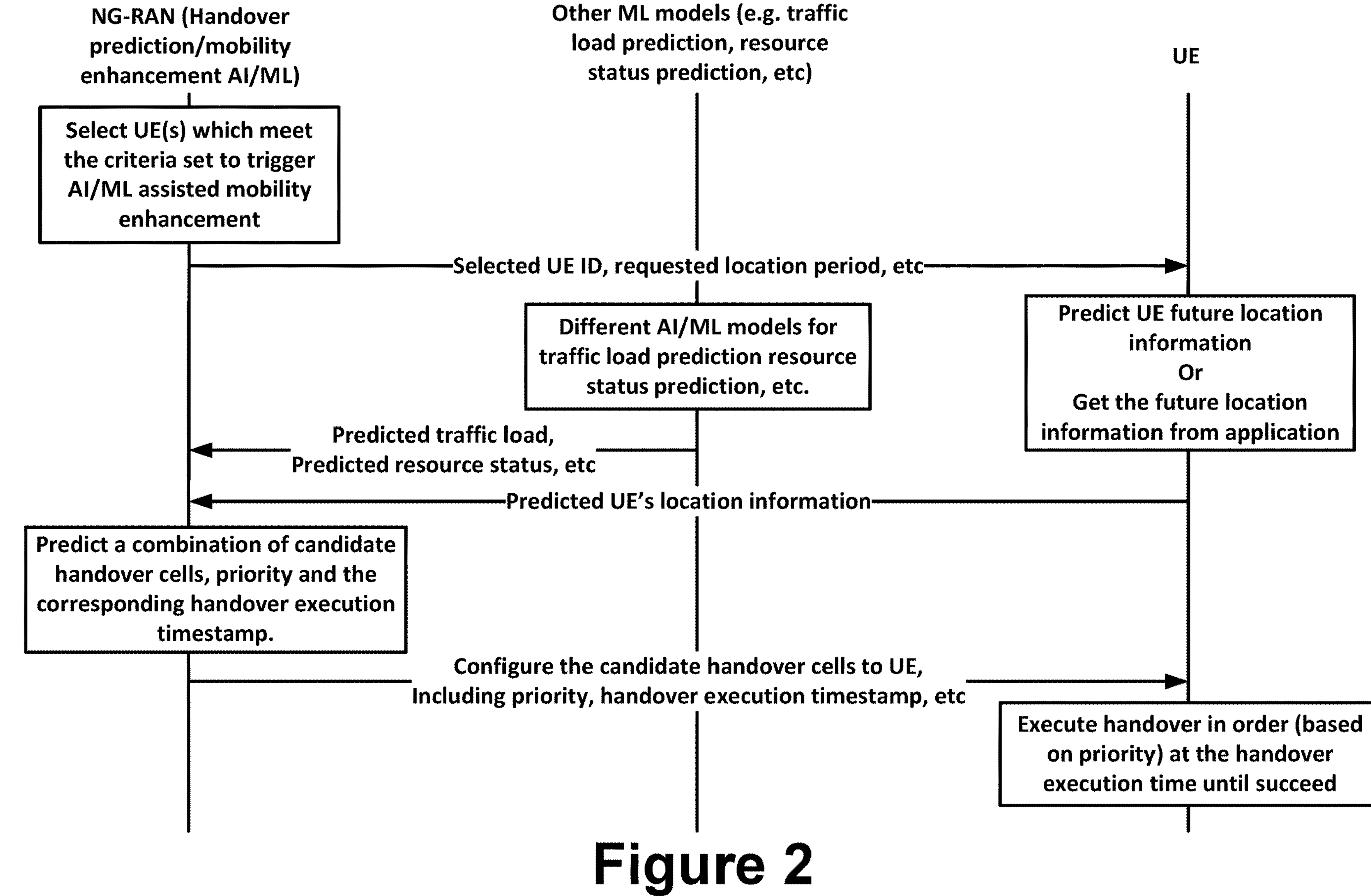
FIG. 2 is a flowchart illustrating another example of a process in accordance with various embodiments.

If location information (e.g. GNSS location information) can either be predicted by UE from AI/ML models or known by UE from positioning function. The uncertainty and confidence are generated based on the results from AI/ML models and positioning algorithms, respectively. An example of a flow chart showing this message flow is shown in FIG. 2.

ReportConfigNR can be expanded to configure the location report, e.g. “LocationInfoReportConfig”. An example of this embodiment is shown as below, changes are marked in underline.

ReportConfigNR information element

```
-- ASNISTART
-- TAG-REPORTCONFIGNR-START
...
MeasTriggerQuantityCLI-r16 ::= CHOICE {
srs-RSRP-r16 SRS-RSRP-Range-r16,
cli-RSSI-r16 CLI-RSSI-Range-r16
}
MeasReportQuantityCLI-r16 ::= ENUMERATED {srs-rsrp, cli-rssi}
LocationInfoReportConfig ::= SEQUENCE {
   reportInterval    ReportInterval,
   reportAmount    ENUMERATED {r1, r2, r4, r8, r16, r32, r64, infinity},
   includeCommonLocationInfo-r16 ENUMERATED {true} OPTIONAL, -- Need
   R
   includeFutureLocationInfoList-rxy ENUMERATED {true} OPTIONAL, -- Need
   R
   includeBT-Meas-r16 SetupRelease {BT-NameList-r16} OPTIONAL, -- Need M
   includeWLAN-Meas-r16 SetupRelease {WLAN-NameList-r16} OPTIONAL, --
   Need M
   includeSensor-Meas-r16 SetupRelease {Sensor-NameList-r16} OPTIONAL --
Need M
}
-- TAG-REPORTCONFIGNR-STOP
-- ASNISTOP
```

LocationInfo information element

```
-- ASNISTART
-- TAG-LOCATIONINFO-START
LocationInfo-r16 ::= SEQUENCE {
   commonLocationInfo-r16 CommonLocationInfo-r16 OPTIONAL,
   bt-LocationInfo-r16 LogMeasResultListBT-r16 OPTIONAL,
   wlan-LocationInfo-r16 LogMeasResultListWLAN-r16 OPTIONAL,
   sensor-LocationInfo-r16 Sensor-LocationInfo-r16 OPTIONAL,
```

-continued

| LocationInfo information element |
| --- |
| FutureLocationInfoList-rxy FutureLocationInfoList-r18 OPTIONAL,<br>...<br>}<br>-- TAG-LOCATIONINFO-STOP<br>-- ASNISTOP |

| FutureLocationInfoList information element |
| --- |
| -- ASNISTART<br>-- TAG-FUTURELOCATIONINFOLIST-START<br>FutureLocationInfoList-rxy :==<br>FutureLocationInfoList-rxy ::= SEQUENCE {<br>future-gnss-TOD-msec-rxy OCTET STRING OPTIONAL,<br>future-locationTimestamp-rxy OCTET STRING OPTIONAL,<br>future-locationCoordinate-rxy OCTET STRING OPTIONAL,<br>future-locationError-rxy OCTET STRING OPTIONAL,<br>future-locationSource-rxy OCTET STRING OPTIONAL,<br>future-velocity Estimate-rxy OCTET STRING OPTIONAL<br>}<br>-- TAG-FUTURELOCATIONINFO-STOP<br>-- ASNISTOP |

Besides, similar as embodiment 1, CHO configuration can be enhanced similarly.

Embodiment 3: Mixed Location/Positioning-Based Mobility Handover

In this embodiment, the network can utilize the location prediction results received from upper layer and future/near-term navigation information reported by the UE. In this scenario, UE does not need to report the accurate location (e.g.GNSS, latitude, longitude, etc.), UE only need to report the velocity in near future and direction in the FutureLocationInfoList. This can help to avoid UE reporting its private information (e.g. accurate location in near future) over the air interface.

The example embodiment of standards impact is similar as Embodiment 1 and Embodiment 2, where NRPPa/NG interface can be enhanced to send predicted location to NG-RAN, and ReportConfigNR, LocationInfo, CondReconfigToAddModList can be enhanced correspondingly.

Example Use Case: Reducing Ping-Pong Event with the Assistance of UE Location and Trajectory Prediction In this embodiment, AI/ML model is trained to select the best serving cell for a certain UE which is experiencing frequent ping-pong handover between two cells. Based on the predicted location, if AI/ML model predicts a UE is moving slowly from the source cell to the target cell or sits in the cell border for a long time, the network can avoid performing handover of such UE to the target node as it may have learnt that this is a result of current network topology at the current location of the UE. The number of ping-pong events can thus be reduced.

Embodiment 5: UE Selection for Mobility Handover Optimization

Not all UEs may require AI/ML based models to predict successful HOs and the configured NRTs etc. are enough for them. It is useful to know which UEs require additional processing and restrict the use of additional information exchange for such UEs alone. It is proposed that the network can select the suitable UE criteria to use AI/ML model to improve the mobility handover performance (e.g. increase handover successful rate, etc), and to reduce heavy signaling exchanges and heavy processing through AI/ML.

The (predicted) location information of the selected UEs is transmitted to the RAN with its UE ID. In this embodiment, three types of criteria of UE selection are described.

Embodiment 5-1. Based on the Statistic of Mobility Event

Number of successful handover preparations
Number of failed handover preparations
Number of successful handover resource allocation
Number of failed handover resource allocation
Number of successful handover execution
Number of failed handover execution If a UE is lower than a certain threshold (for a successful event count) or higher than a certain threshold (for a failed event count), the network can select the UE for using AI/ML prediction to improve the Handover success rate.

Alternatively, the threshold can also be set by the ratio between above event counts and the corresponding requested handover events.

support this functionality, the selected UE ID should be decided by the network. For embodiment 1, the selected UE ID is transmitted to LMF/MDA/NWDAF to request location information. For embodiment 2, NG-RAN can configure positioning functionality selectively to the selected UEs (if the UE also have the positioning capability), where only the selected UE need to perform positioning calculation/prediction and report accordingly. Additionally, the above listed events should be collected for each UE.

Embodiment 5-2. Based on the UE Information and AI/Model Accuracy Measures

The accuracy of the AI/ML model outcome highly depends on the coverage of the training data set. Sometimes, for certain environment or scenario, the AI/ML model may not be able to make the right/precise decision (as the input is far beyond the data set coverage) and has low accuracy results. In mobility use cases, the wrong decision will lead to severe service interruption caused by failed handover. Hence in the trigger condition for the gNB to seek additional AI support, a measure of past accuracy result for these scenarios along with the UE information could be incorporated. In this case, it is proposed the AI/ML based mobility model is used for the UEs with higher accuracy results which may be for more common scenarios for, e.g. moving along the road with a fixed speed/direction, etc. The easier UE's trajectory can be predictable, the higher accuracy of AI/ML generated predicted handover. The network may select the UEbased on following example UE information:

UE's current/future speed under a threshold

UE's current/future speed is not changed for a certain time

UE's current/future moving direction is unchanged for a certain time

Embodiment 5-3. Based on UE Device Type

For some environments, UE location is easily predictable as the trajectory is following a known map, such as factory, road, indoor, etc. In this case, the network can also select the UE according to its device type as the type of UE environment may provide additional contextual information that would help the AI model in doing a more accurate job in predicting it's trajectory.

To support this functionality, UE need to report its device type/access category when accessing to the network, new device type/access category may include (but not limited to):

Factory

Vehicle

Indoor device

Mobile phone

Rural area

Outdoor agricultural

Network-Oversighted AI/ML Training and Inference

Applications of Machine learning (ML) for RAN intelligence have been widely studied in academia and standardization groups, such as 0-RAN, 3GPP, etc. 3GPP Rel-18 also starts to look into how to adopt AI/ML over air interface, by taking advantage of benefits from AI/ML. As defined in TR 37.817, v. 0.1.0, 2021 Jan. 4 (from RAN3 SI "enhancement for data collection for NR and EN-DCoversig"), functional framework of supporting AI/ML in RAN includes "Data Collection", "Model Training", "Model Inference" and "Actor". It is possible that those functional nodes are deployed at either network side or UE side.

Regarding to AI/ML over air interface, in general, the involvement of network and UE in the AI/ML procedure can be considered with two scenarios. Scenario 1: either the network or the UE performs AI/ML training and inference solely and independently, that is "Model Training", "Model Inference" and "Actor" are locates either at network side or UE side. In this scenario, model transfer over the air interface may not be needed. For majority scenarios, it can be achieved by implementation or with additional assistance information transferred over the air interface, such as measurement reports or data collections. In the second scenario, to bring more visibility to the network and let the network understand the behavior/knowledge of UE's AI/ML model, it is also possible that the initial AI/ML models (e.g. AI/ML model may not be totally suitable for one UE) running at the UEs are received/configured by the network over certain configurations. Moving further when integration between AI/ML and wireless network becoming tighter, the UE can download well-trained model from the network and perform "Model inference", when "Model training" at the network side. The UE may even consider federated learning together with the network.

Figure 3:
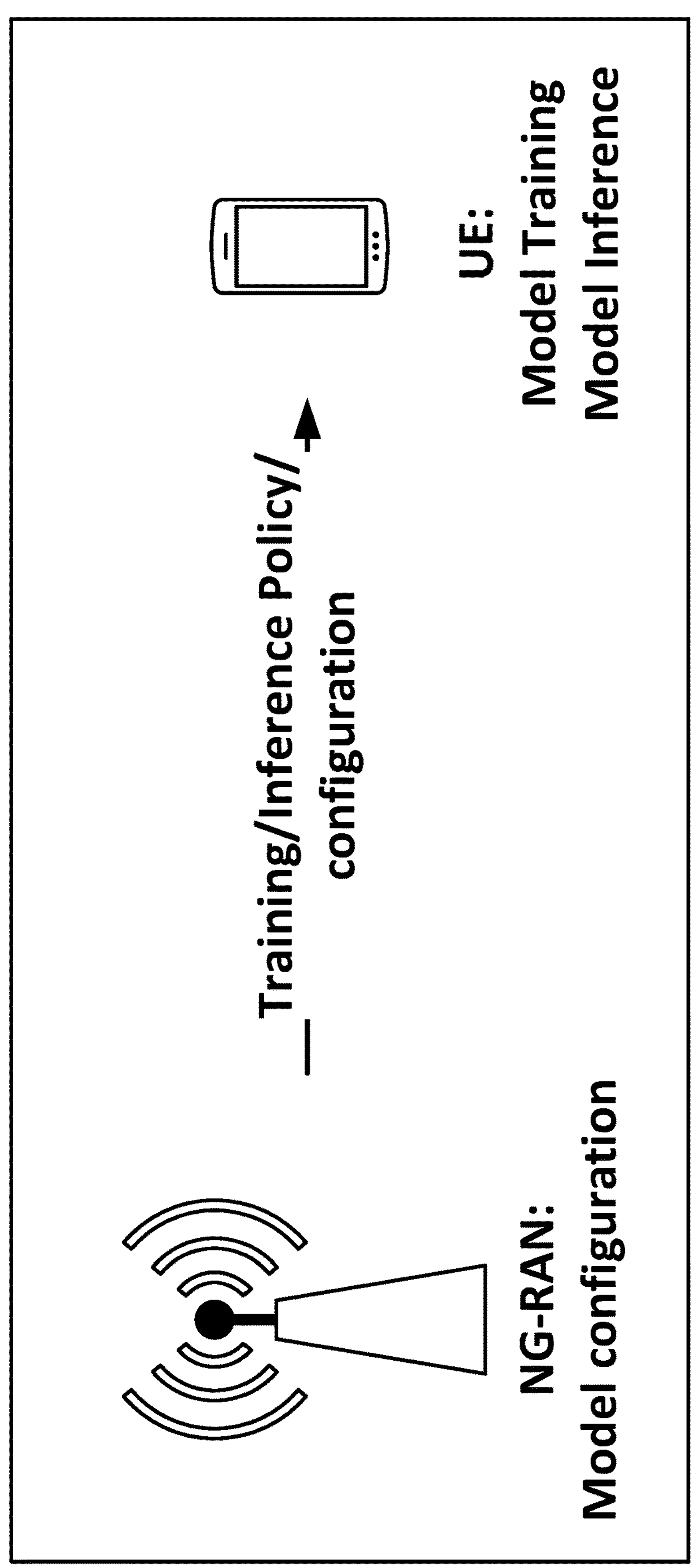
FIG. 3 illustrates an example of network controls model training and inference at a UE, with no model downloading from NG-RAN in accordance with various embodiments.
Figure 4:
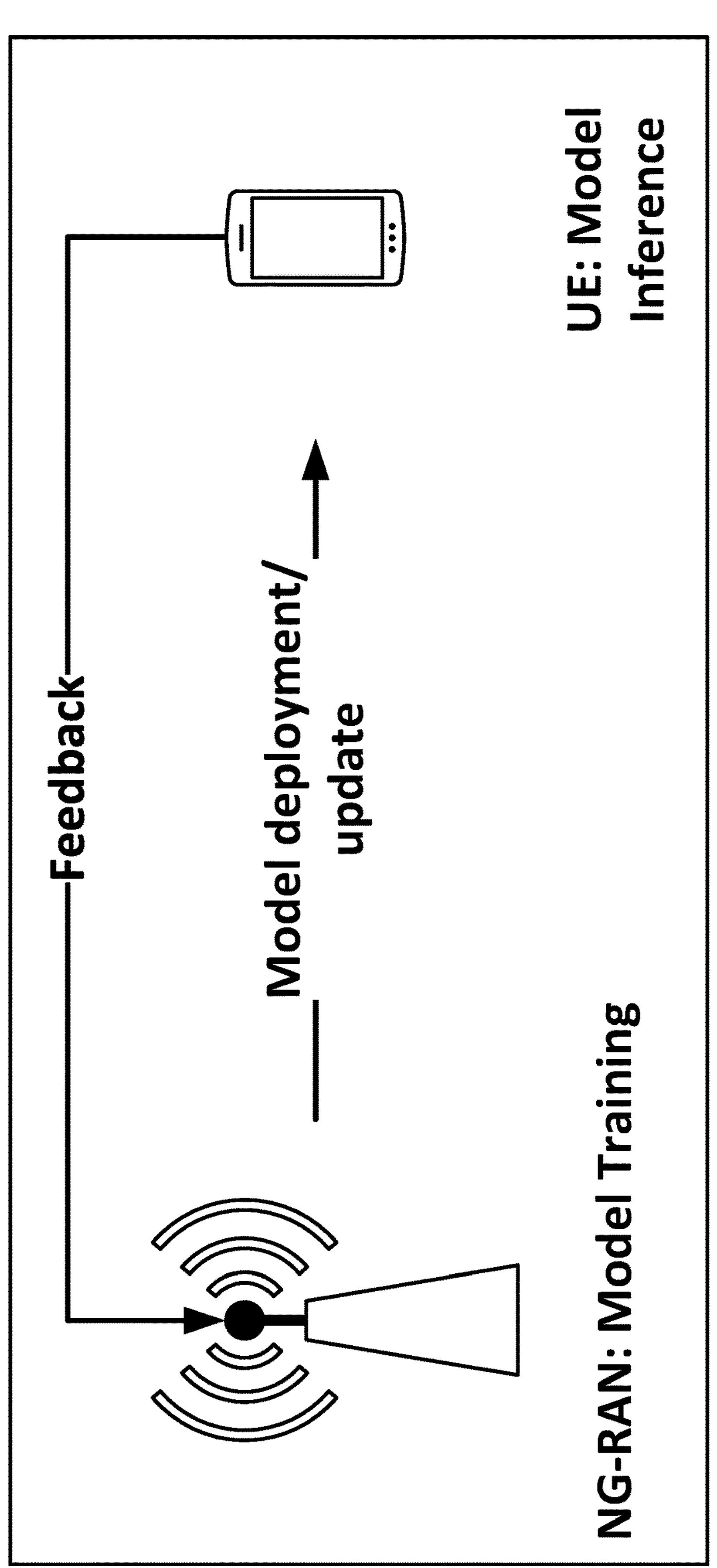
FIG. 4 illustrates an example of a model for inference downloading to the UE in accordance with various embodiments.
Figure 5:
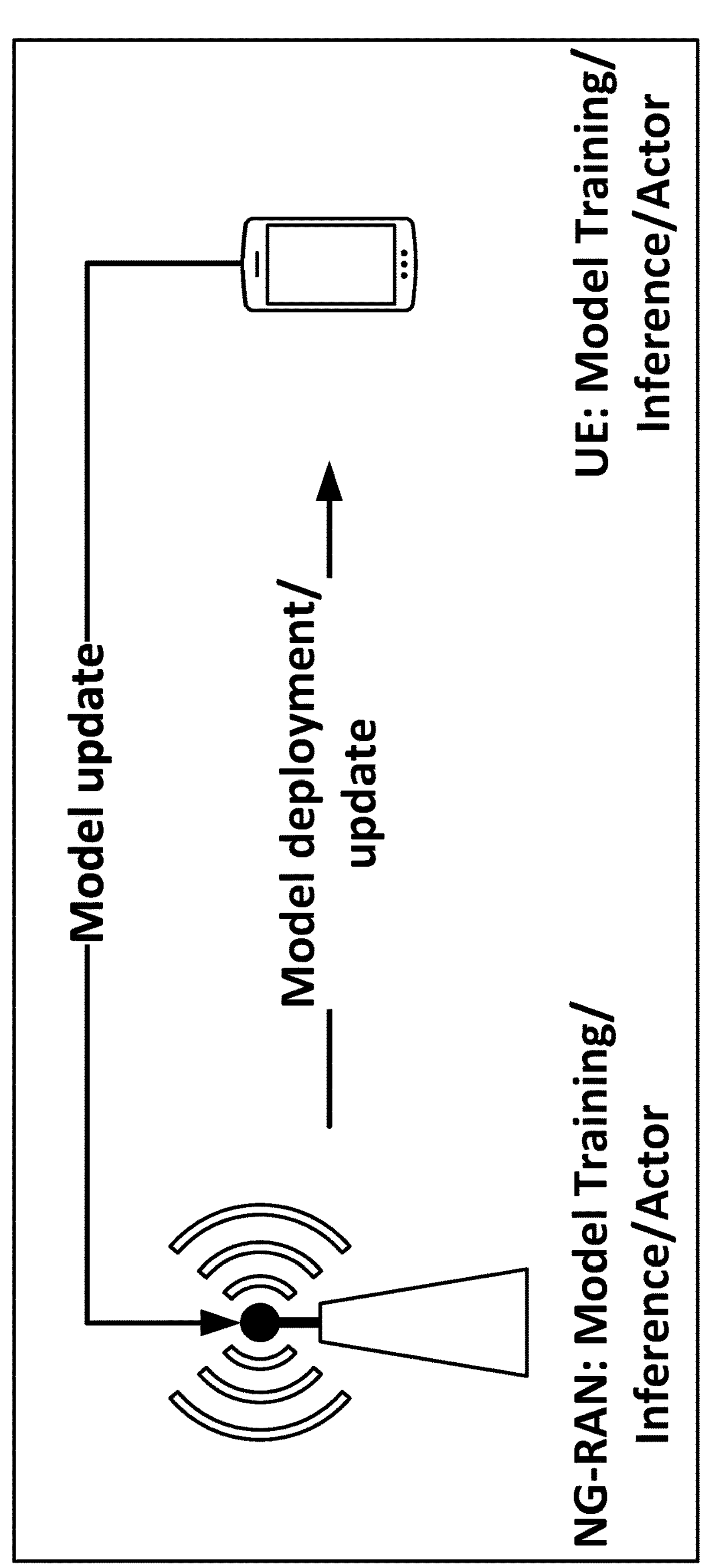
FIG. 5 illustrates an example of federated learning between the network and the UE in accordance with various embodiments.

FIGS. 3, 4, and 5 show the three scenarios of AI/ML model at the UE to be oversighted by the network. In particular, FIG. 3 illustrates an example of model training/inference at the UE side, while UE training/inference policy/configuration is configured by NG-RAN. FIG. 4 illustrates an example of model training at the network side (RAN), while model inference at the UE side. FIG. 5 illustrates an example of model training and model inference locates at both network side and UE side (e.g. federated learning).

To achieve a more understandable AI/ML behavior at the UEs and trust the result/outcome generated by AI/ML model at the UE side, the network should be able to control how the UEs perform training and inference. That is, besides the model update policies and other aspects, the network should be able to control the AI/ML training/inference behavior at the UE side, so that it can control the damage in case the training/inference at the UE side is wrong or non-convergence.

Various embodiments herein provide mechanisms to support model training and inference at UE side, where the UE AI/ML behavior can be configured/oversighted by the network. To generate a trustable and reliable results from AI/ML model located at UE side, different scenarios of AI/ML training and inference may be analyzed when they are jointly or separately located at UE and NG-RAN, then describe the configuration and signaling procedure to support the network-oversighted AI/ML at UE, including configuration parameters, conditions of configuration, etc.

The described mechanism can support UE to generate the result/actions which can be trusted by the network when using AI/ML at UE side. The described mechanism helps to build a reliable wireless system when using AI/ML at network and UE, especially when UE is allowed to perform model training/re-training.

To allow the network to control the ML training and inference at the UE side, consider two-levels of information which need to be exchanged between the network and the UE: 1) whether require model downloading from the network, and 2) network-oversighted UE's model training/inference configuration.

In some embodiments, to exchange the first level of information (e.g. request to download model from the network or not), the UE can learn the machine learning capability and network supported models/services enabled by AI/ML through the broadcast information (e.g. MachineLearningSupport field) via MLCapabilityIndication. For those services where the network can offer the AI/ML models, UE can decide whether to register or request a ML model from the network based on the received information, and send the corresponding service registration/interest indication message back to the network as model downloading request. In this scenario, the network is responsible for model transfer, update, etc. However, it is also possible that the UE will not request model from the network, this can either because the UE does not have the ML capability, or because the UE holds the ML model itself.

The same model training/inference configuration is also adoptable when the UE is allowed to perform local model training (e.g. federated learning).

In some embodiments, the AI/ML model can always be downloaded to the UE according to the UE ML capability and request. In the present disclosure, ML related information exchanging may be expanded to have a wider scope, where the network can configure UE training and inference, where model downloading from the network is not a constraint.

Figure 6:
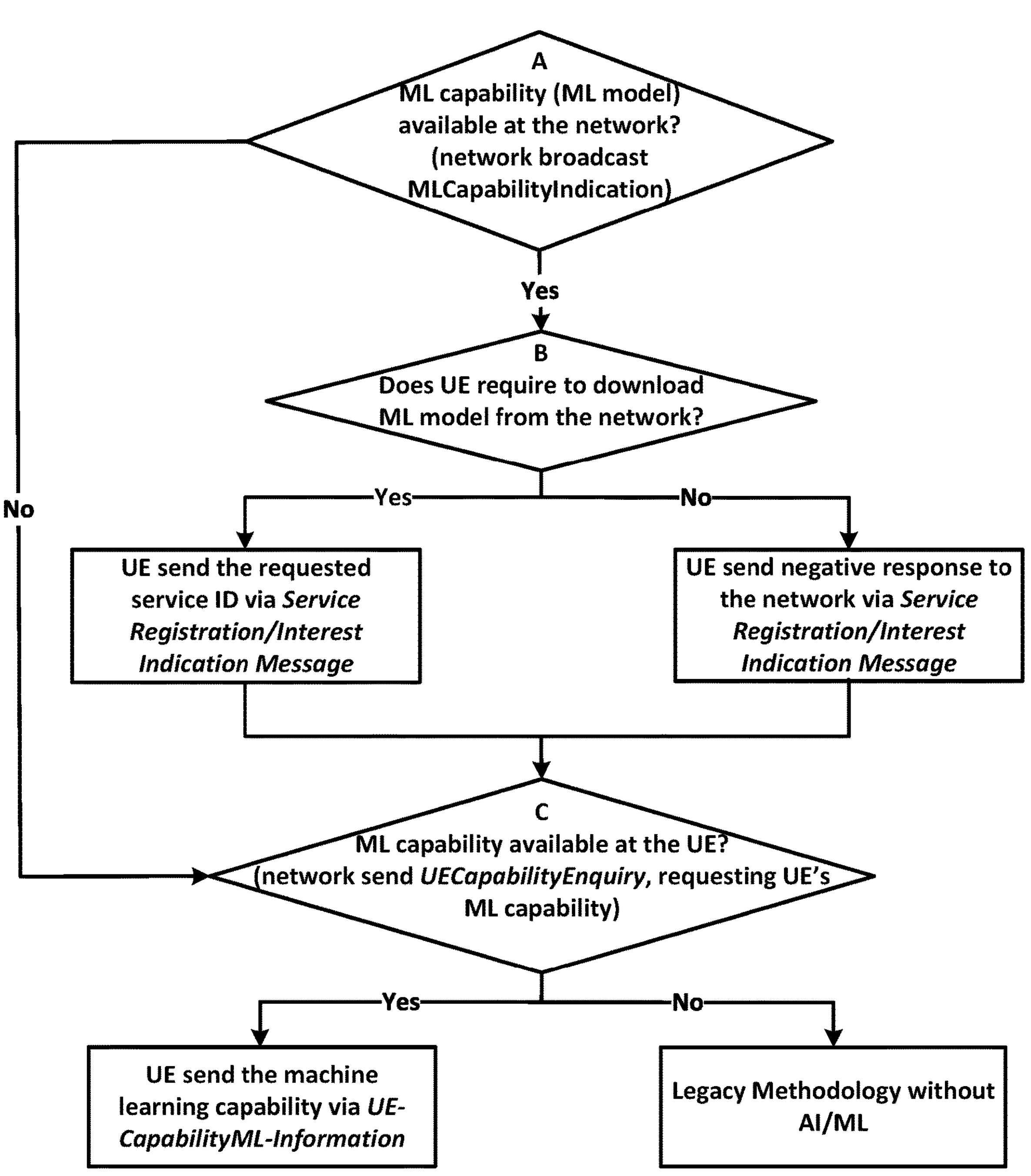
FIG. 6 illustrates an example of how a network decides ML configuration in accordance with various embodiments.

As illustrated below in Table 1, six scenarios are identified to help the network to determine what configuration(s) the network need to send to the UE. FIG. 6 illustrates an example of a process flow for a network to determine ML configuration.

Moreover, two sets of ML configurations are described to be send over air interface via RRC signaling.

Set 1: UE training configuration (ModelTrainingConfiguration)

Model ID

Service ID (e.g. CSI feedback, positioning, beam management, etc)

TrainingIndicator

If this field is present, it indicates that the UE is allowed to perform training/re-training. If it is not presented, the UE is not configured to further perform training/re-training, either for its own model or model received from network.

PrivateModelTraining

If this field is present, it indicates that the UE is allowed to use its own ML model. If it is not presented, the UE should not use its own ML model, even it has the corresponding ML capability.

The training configuration is considered per model basis, where the model type is determined by modeltype reported by the UE via UE-CapabilityML-Information. The network can configure the full-set or the subset of the supported model at the UE.

The UE reports supported configuration to the network in UE capability "UE-CapabilityML-Information"; network then configure the optimized configuration/threshold based on network training experience and best knowledge of one use case.

Model type (CNN, RNN, DNN, regression, etc)

Model configuration

The UE should perform model training according to the following configuration list, then return with the evaluation results through new IE "TrainingReport" in MachineLearningReport or in MachineLearningModelUpdateRequest a separate message from UE to network. If the reported evaluation results meet the performance threshold, the network can send an ACK of "TrainingFeedback" to the UE via MachineLearningConfiguration or in MachineLearningModelUpdateRequest or a new message from network to UE, indicating UE's trained AI/ML can be used. Otherwise, if UE receives a NACK of "TrainigFeedback" from the network, UE should continue training, and repeat the previous procedure.

An alternative can be NW configure the metrics together with the corresponding threshold for UE. Once all thresholds are met, UE can declare that the training is done via new IE "TrainingComplete" via MachineLearningReport or a separate message from UE to network.

The configuration may include:

Optimizer

```
Optimizer Algorithm that the UE should use for training optimization include
{
SGD, RMSprop, Adam, Adadelta, Adagrad, Adamax, Nadam, Ftrl
}
```

Besides the algorithm configuration, the following two parameters should also be set to help UE get convergence to the training model:

```
{
Learning rate;          ---- the learning rate of the optimizer
Weights.                ---- the state of the optimizer.
}
```

Loss

Compute the quantity that a model should seek to minimize during training.

Losses functions/classes that the UE should use for training evaluation include three categories:

```
{
  Probabilistic losses;
  Regression losses;
  Hinge losses for maximum-margin classification
}, where
Probabilistic losses
{
  BinaryCrossentropy;
  CategoricalCrossentropy;
  SparseCategoricalCrossentropy;
  Poisson;
  KLDivergence;
  ....
}
Regression losses
{
  MeanSquaredError;
  MeanAbsoluteError;
MeanAbsolutePercentageError;
MeanSquaredLogarithmicError;
CosineSimilarity;
Huber;
LogCosh;
....
}
And Hinge losses for maximum-margin classification
{
  Hinge;
  SquaredHinge;
  CategoricalHinge;
....
}.
```

Metrics

The metrics is used to judge the performance of the training model.

Six metrics are described to be included in the configuration:

```
{
  Accuracy metrics;
Probabilistic metrics;
Regression metrics;
Classification metrics;
Image segmentation metrics;
Hinge metrics.
}, where
Accuracy metrics
{
```

-continued

```
    Accuracy;
    BinaryAccuracy;
CategoricalAccuracy
TopKCategoricalAccuracy
SparseTopKCategoricalAccuracy
}
Probabilistic metrics
{
BinaryCrossentropy
CategoricalCrossentropy
SparseCategoricalCrossentropy
KLDivergence
Poisson
}
Regression Metrics
{
    MeanSquaredError
RootMeanSquaredError
MeanAbsoluteError
MeanAbsolutePercentageError
MeanSquaredLogarithmicError
CosineSimilarity
LogCoshError
}
Classification metrics
{
AUC
Precision
Recall
TruePositives
TrueNegatives
FalsePositives
FalseNegatives
PrecisionAtRecall
SensitivityAtSpecificity
SpecificityAtSensitivity
}
Image Segmentation metrics
{
MeanIoU
}, and
Hinge metrics
{
    Hinge
SquaredHinge
CategoricalHinge
}
```

Loss weight

Optional list or dictionary specifying scalar coefficients to weight the loss contributions of different model outputs.

Accuracy level

This parameter is the lower bound of one AI/ML model need to meet. The UE may stop AI/ML model training when the configured accuracy is met.

Steps per execution

The number of batches to run during each call.

For federated learning between network and UE, the following parameters may also need to be configured:

Aggregate bit

Data that each UE can return to the base station after local retraining

Additionally, network can also configure the wireless KPI (e.g. throughput, SINR, BLER, etc) and AI/ML model KPI (e.g. accuracy level of the model, confidence level of the model, etc) for different use cases.

Set 2: ML model related information, including service type, report configuration, policy guidance, behavior type, bias threshold and variance threshold for model update request, model itself, model parameter update.

Moreover, recalling that the UE may download ML model from the network, while only perform ML inference. The network should also indicate the UE whether it can continue perform model (re-)training for each transferred ML model.

Additionally, the required inputs to the ML model for training and inference should also be configured per model basis.

Model input

This is used to carry the fields/parameters that are defined as ML model input for model training/inference if UE's ML model is received from the network.

Model output

This is used to carry the fields/parameters that are defined as ML model output for model training/inference if UE's ML model is received from the network.

Moreover, UE should also send a request or an indicator informing the network whether model downloading/transferring is required or not. This indicator can be sent together with service registration/interest indication message.

The RRC impacts may be used used to carry the above signaling and messages.

Embodiment 1: No Model Transfer/Downloading from the Network to the UE

This embodiment presents a scenario where the model is trained and inferenced at the UE side. To help the network understand the behavior at the UE side, the training at the UE side should be oversighted by the network in certain degree, so that the network can trust the result/outcome of the ML inference.

Figure 7:
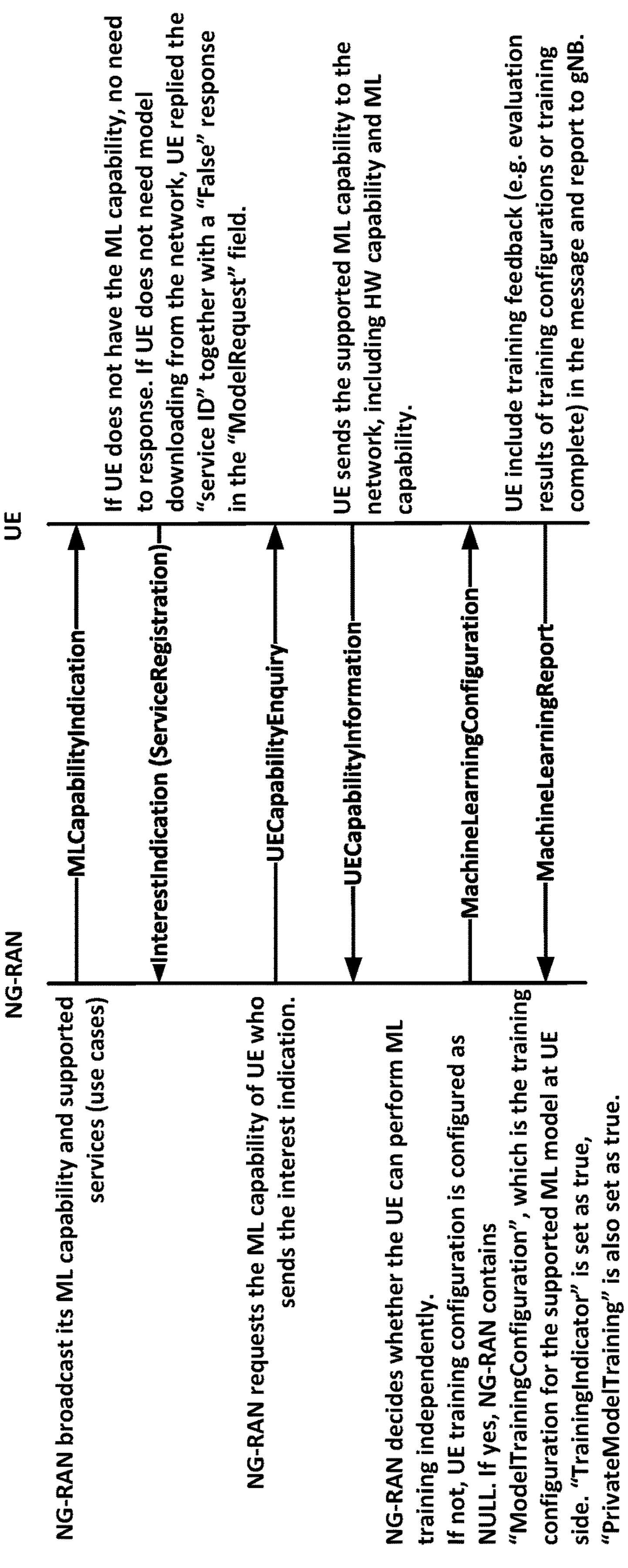
FIG. 7 illustrates an example of a general procedure of network-oversighted UE's ML training and inference in accordance with various embodiments.

To support the above scenario, Set 1 configuration should be sent to the UE who are going to perform ML training and inference independently. FIG. 7 shows an example of a general procedure of network-oversighted UE's ML training and inference.

Figure 8:
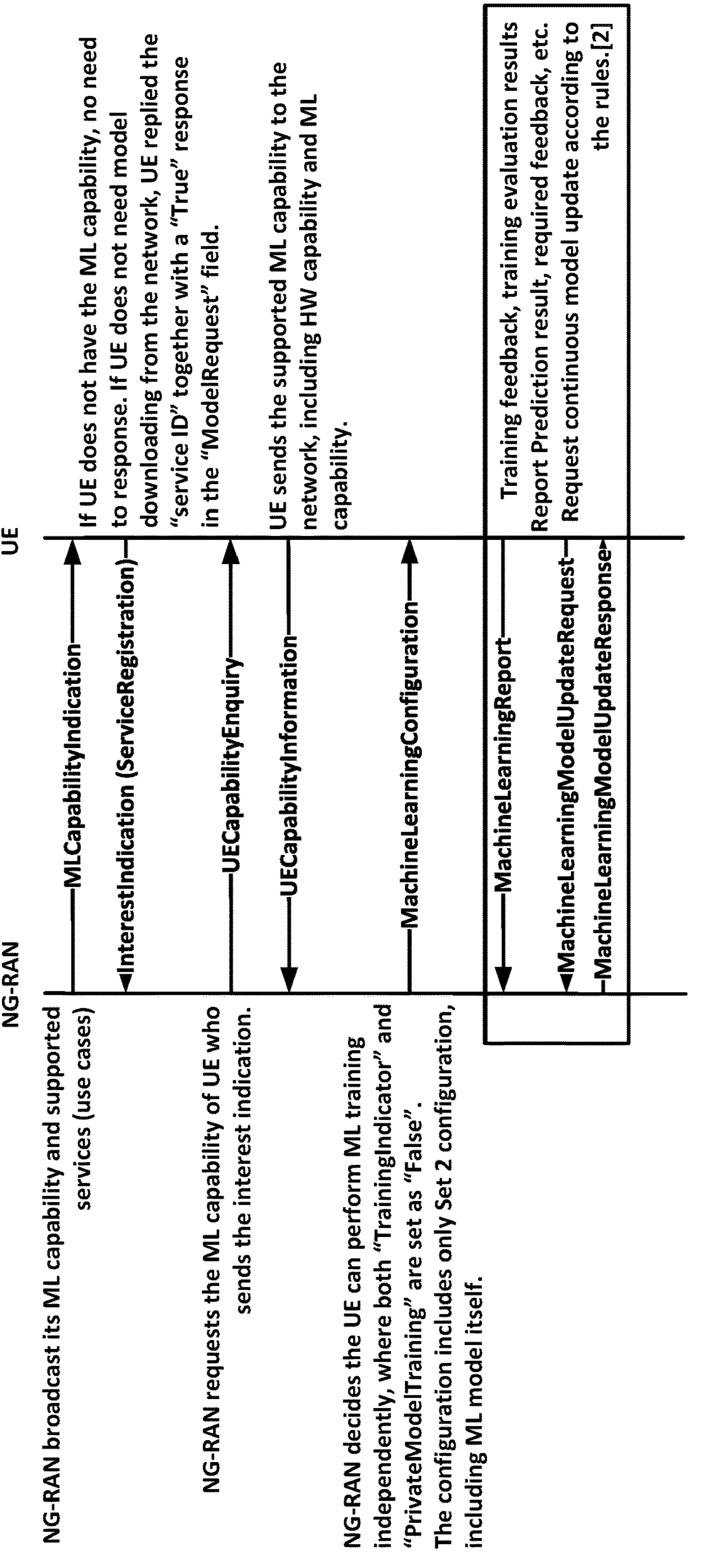
FIG. 8 illustrates an example of a general procedure of model transferring for UE ML inference in accordance with various embodiments.

Embodiment 2: UE Downloads ML Model from the Network, While Only Perform ML Inference In this embodiment, UE can only perform ML inference to the received ML model from the network. To support it, both Set 1 and Set 2 configurations should be configured to the applied UE. An example of this general procedure is shown in FIG. 8.

Figure 9:
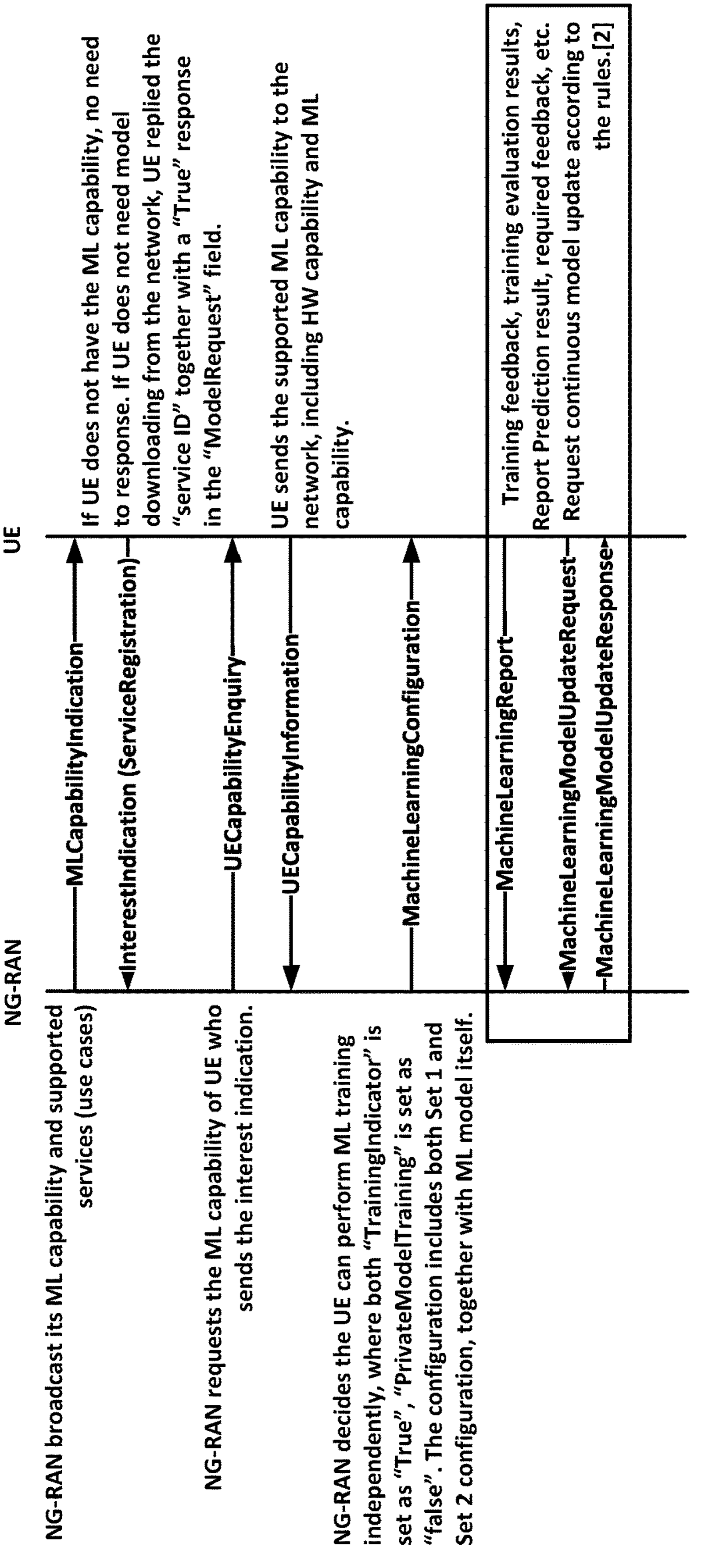
FIG. 9 illustrates an example of a general procedure of model transferring for UE ML training and inference in accordance with various embodiments.

Embodiment 3: UE Downloads ML Model from the Network, Performing Both ML (Re-)Training and ML Inference Similar as Embodiment 2, ML model is transferred from the network to the UE, while the UE is allowed to perform (re-training) to the received model according to the training configuration. Both Set 1 and Set 2 configuration needs to be supported. The procedure supporting embodiment 3 is shown in FIG. 9. The configuration sets and the freedom of UE performing ML training and inference is summarized below in Table 1.

TABLE 1

NW/UE training/inference configuration selection

| | Scenario | | Configuration |
|---|---|---|---|
| No Model downloading from the network to the UE | Scenario 1 | A: Yes, B: No, C: Yes | Set 1 |
| | Scenario 2 | A: Yes, B: No, C: No | ML at the network side |
| | Scenario 3 | A: Yes, C: No | ML at the network side |
| Model downloading | Scenario 4-1 | A: Yes, B: Yes, C: Yes | Set 1, Set 2 |

TABLE 1-continued

| NW/UE training/inference configuration selection | | | |
|---|---|---|---|
| | Scenario | | Configuration |
| from the network to the UE | | (UE is allowed for (re-) training for the received model) | |
| | Scenario 4-2 | A: Yes, B: Yes, C: Yes (UE is not allowed for (re-)training for the received model) | Set 2 |
| | Scenario 5 | A: Yes, B: Yes, C: No | Not exist. |

A: ML capability available at the network?
B: Does UE require to download ML model from the network?
C: ML capability available at the UE side?

Annex
- SGD
  - Name
    - The name of SGD. "sgd".
  - Learning rate
    - The learning rate. Floating point value.
  - Momentum
    - A parameter that accelerates gradient descent in the relevant direction and dampens oscillations.
  - Nesterov
    - Indicate whether to apply Nesterov momentum. Boolean {True, False}.
- RMSprop
  - Name
    - The name of RMSprop. "RMSprop".
  - Learning rate
    - The learning rate. Floating point value.
  - Rho
  - Discounting factor for the history/coming gradient.
  - Momentum
  - A parameter that accelerates gradient descent in the relevant direction and dampens oscillations.
  - Epsilon
    - A small constant for numerical stability.
  - Centered
    - Indicate whether gradients are normalized by the estimated variance of the gradient (true) or by the uncentered second moment (false). Boolean {True, False}.
- Adam
  - Name
    - The name of Adam. "Adam".
  - Learning rate
    - The learning rate. Floating point value.
  - Beta_1
    - The exponential decay rate for the 1st moment estimates.
  - Beta 2
    - The exponential decay rate for the 2nd moment estimates.
  - Epsilon
    - A small constant for numerical stability.
  - amsgrad
    - Indicate whether to apply AMSGrad variant of this algorithm. Boolean {True, False}.
- Adadelta
  - Name
    - The name of Adadelta. "Adadelta".
  - Learning rate
    - The learning rate. Floating point value.
  - rho
    - The decay rate. Range:
  - Epsilon
    - A small constant for numerical stability.
- Adagrad
  - Name
    - The name of Adagrad. "Adagrad".
  - Learning rate
    - The learning rate. Floating point value.
  - Initial accumulator value
    - Starting value for the accumulators (per parameter momentum values).
    - Range:
  - Epsilon
    - A small constant for numerical stability.
- Adamax
  - Name
    - The name of Adamax. "Adamax".
  - Learning rate
    - The learning rate. Floating point value.
  - Beta_1
    - The exponential decay rate for the 1st moment estimates.
  - Beta_2
    - The exponential decay rate for the exponentially weighted infinity norm.
  - Epsilon
    - A small constant for numerical stability.
- Nadam
  - Name
    - The name of Nadam. "Nadam".
  - Learning rate
    - The learning rate. Floating point value.
  - Beta_1
    - The exponential decay rate for the 1st moment estimates. Range:
  - Beta_2
    - The exponential decay rate for the exponentially weighted infinity norm.
  - Epsilon
    - A small constant for numerical stability.
- Ftrl
  - Name
    - The name of Adagrad. "Adagrad".
  - Learning rate
    - The learning rate. Floating point value.
  - Learning rate power
    - Controls how the learning rate decreases during training. Float value.
- Range
  - Initial accumulator value
    - The starting value for accumulator.
  - L1 regularization strength
    - Float value.
  - L2 regularization strength
    - Stabilization penalty.
  - L2 shrinkage regularization strength
    - A magnitude penalty, that will only happen on the active weights.
- beta
  - Float value.

AI/ML Model Updates in an NG-RAN Network

3GPP RAN3 started to study AI intelligence in RAN network in Rel-17, where RAN intelligence functional framework is discussed, including mapping of AI/ML functionality into existing NG-RAN architecture. In 3GPP RAN3, RAN intelligence will first address use cases related to SON (self-organizing network), for example, load balancing, network energy saving, and mobility optimization. 3GPP Rel-18 will also investigate how to adopt AI/ML over air interface.

In mobile communications systems, mobile devices (e.g., smartphones, automotive, robots, etc.) are increasingly replacing conventional algorithms (e.g., speech recognition, image recognition, video processing, etc.) with AI/ML models to enable applications. The 5G system (5GS) can at least support three types of AI/ML operations: AI/ML operation splitting between AI/ML endpoints; AI/ML model/data distribution and sharing over 5G system; and Distributed/Federated Learning over 5G system.

Figure 10:
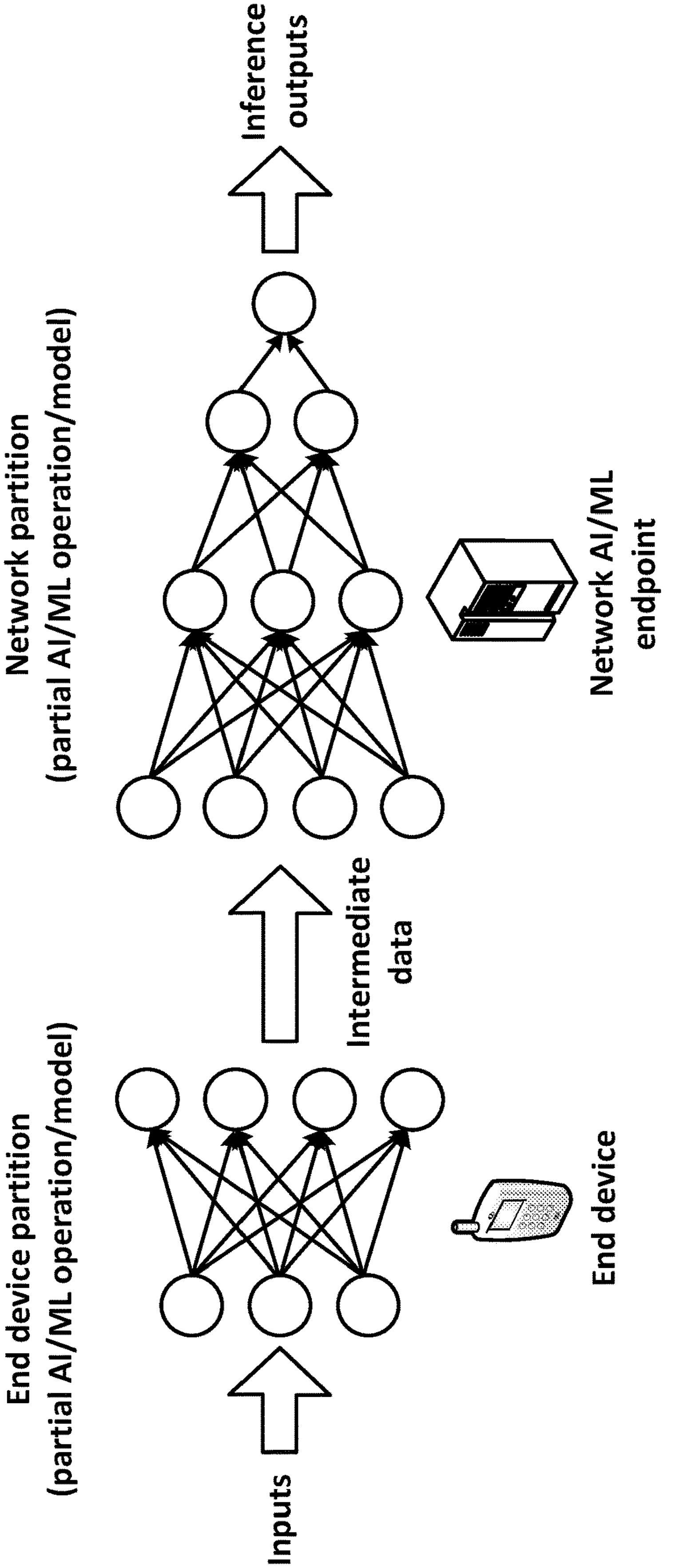
FIG. 10 illustrates an example of split AI/ML inference in accordance with various embodiments.

An example of a scheme of split AI/ML inference is depicted in FIG. 10. The AI/ML operation/model is split into multiple parts according to the current task and environment. The intention is to offload the computation-intensive, energy-intensive parts to network endpoints, whereas leave the privacy-sensitive and delay-sensitive parts at the end device. The device executes the operation/model up to a specific part/layer and then sends the intermediate data to the network endpoint. The network endpoint executes the remaining parts/layers and feeds the inference results back to the device.

Figure 11:
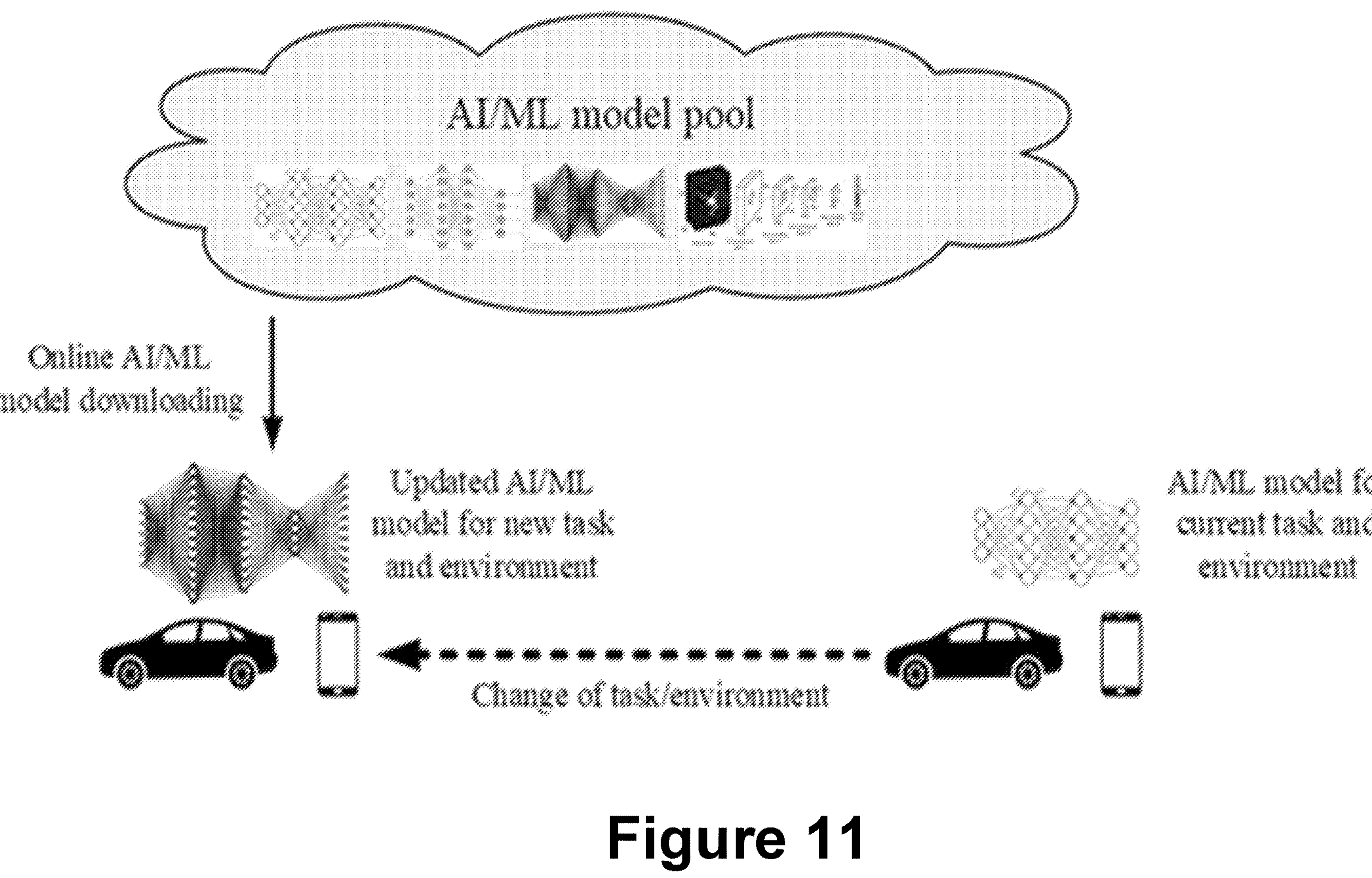
FIG. 11 illustrates an example of AI/ML model downloading over a 5G system in accordance with various embodiments.

An example of a scheme of AI/ML model distribution is depicted in FIG. 11. Multi-functional mobile terminals might need to switch the AI/ML model in response to task and environment variations. The condition of adaptive model selection is that the models to be selected are available for the mobile device. However, given the fact that the AI/ML models are becoming increasingly diverse, and with the limited storage resource in a UE, it can be determined to not pre-load all candidate AI/ML models on-board. Online model distribution (e.g., new model downloading) is needed, in which an AI/ML model can be distributed from a NW endpoint to the devices when they need it to adapt to the changed AI/ML tasks and environments. For this purpose, the model performance at the UE needs to be monitored constantly.

Figure 12:
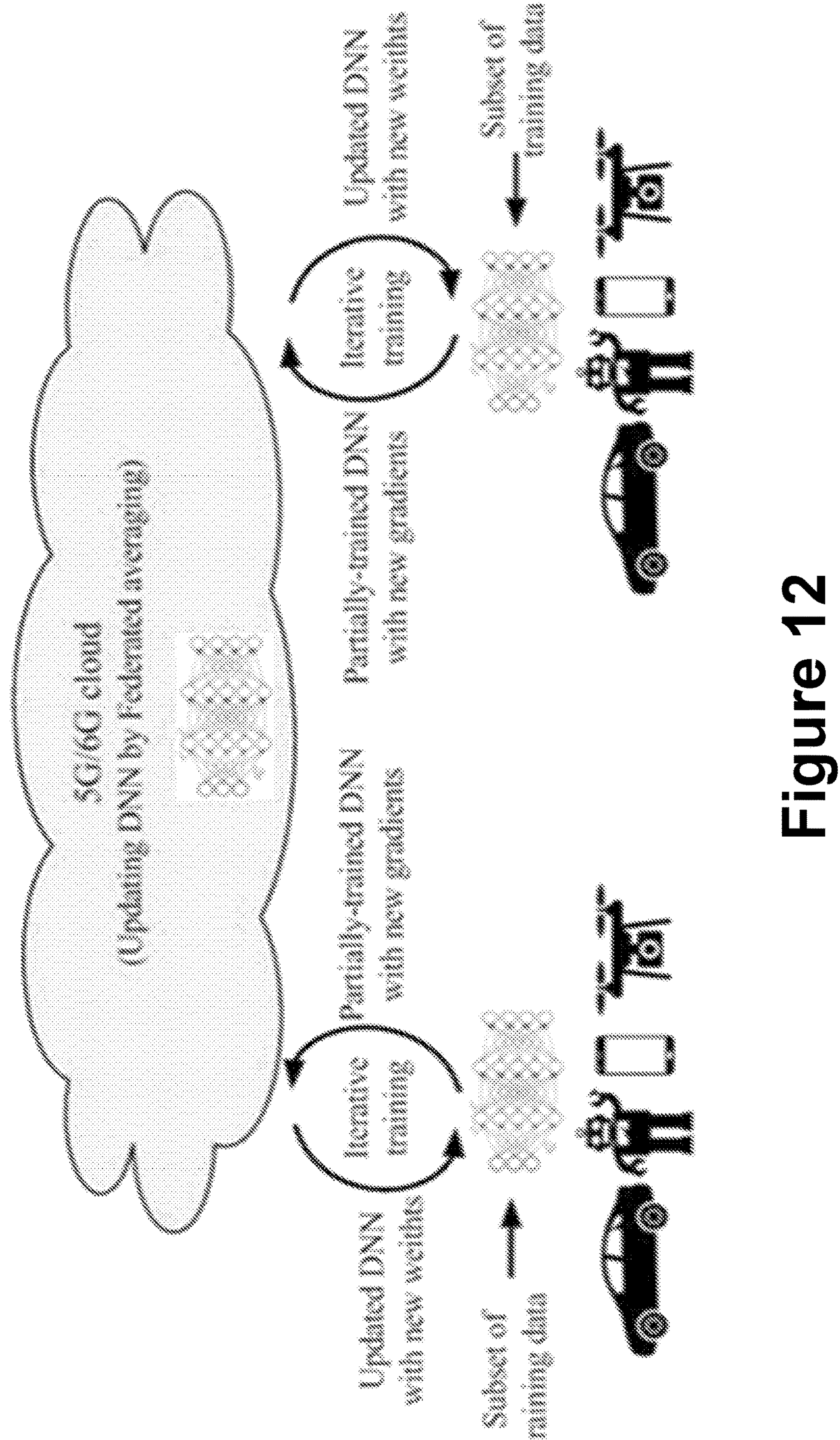
FIG. 12 illustrates an example of federated learning over a 5G system in accordance with various embodiments.

An example of a scheme of Federated Learning (FL) is depicted as in FIG. 12. The cloud server trains a global model by aggregating local models partially-trained by each end devices. Within each training iteration, a UE performs the training based on the model downloaded from the AI server using the local training data. Then the UE reports the interim training results to the cloud server via 5G UL channels. The server aggregates the interim training results from the UEs and updates the global model. The updated global model is then distributed back to the UEs and the UEs can perform the training for the next iteration.

As discussed in 3GPP TR 37.817 v0.1.0 (2021-01-04) ("[TR37817]") (from RAN3 SI "enhancement for data collection for NR and EN-DC"), a functional framework of supporting AI/ML in RAN includes "Data Collection", "Model Training", "Model Inference" and "Actor". Where to realize each AI/ML functionality highly depends on use cases to address and various requirements related to data collection and performance (e.g., latency, real-time, etc).

Previous proposals have considered different deployment types of AI/ML model training and model inference functionalities between CN, RAN and UE. In some deployment options, one network node/UE may deploy an AI/ML model to another one for model inference or re-training purpose.

Additionally, 3GPP SA1 initiated the study of traffic characteristics and performance requirements for AI/ML model transfer in 5GS, which also support model downloading and update from network to UE (see e.g., 3GPP TR 22.874 v18.0.1 (2021 Jun. 24) ("[TR22874]")).

Figure 13:
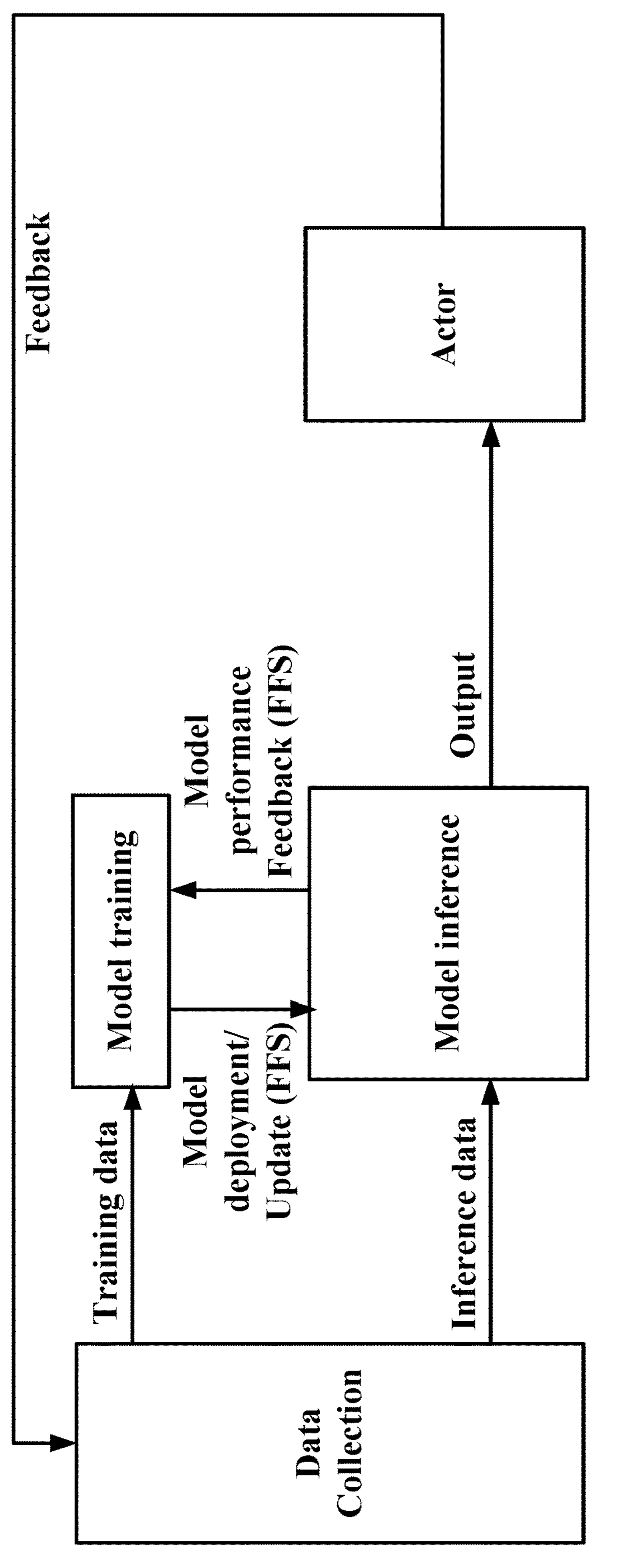
FIG. 13 illustrates an example of a RAN intelligence functional framework in accordance with various embodiments.
Figure 14:
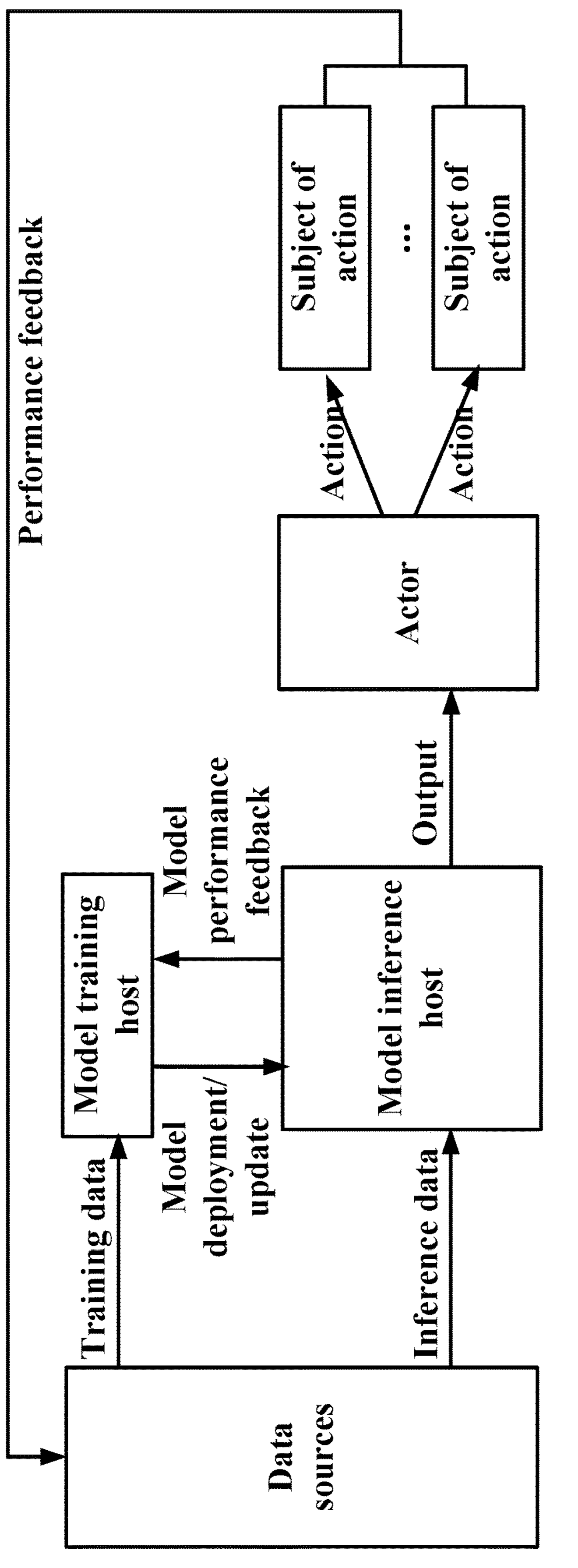
FIG. 14 illustrates an example of another Functional Framework for RAN Intelligence in accordance with various embodiments.

An example of a RAN intelligence functional framework is shown in FIG. 13, where model deployment/update from "Model training" to "Model inference" are issues for future study. An example of another Functional Framework for RAN Intelligence is shown in FIG. 14.

The accuracy of AI/ML models highly depends on training data (e.g., data that is used to train an AI/ML model), where different scenarios and events should be considered as part of the training process. Hence, it is important to monitor the performance of models deployed in the "Model inference" and to timely provide an update if necessary, so that the accuracy of generated outputs from "Model inference" can be guaranteed with best performance all the time. However, none of the current work in 3GPP (SA1, SA2, SA5 and RAN3) started to discuss on how to update the deployed AI/ML model(s) over the system (from CN/operations, administrations, and management function (OAM) to RAN or from RAN to UE).

The present disclosure provides a mechanism to update AI/ML models (e.g., for inferences, predictions, federated learning, etc.) between network nodes (e.g., from CN and/or OAM to RAN) or between network and UE (e.g., from CN, OAM, and/or RAN to UE). The AI/ML model update can be triggered based on following conditions: 1) timer (e.g., expiration of a timer); 2) loss weight of model outputs; 3) accuracy level of AI/ML model; 4) probabilistic of AI/ML model generated output; 5) performance feedback; 6) per request from NG-RAN or UE; and/or 7) trigger/indication from CN/OAM or NG-RAN.

The mechanisms discussed herein maintain a good performance AI/ML model by updating models between network node(s) and/or UE(s) and between different network nodes according to certain rules, trigger conditions, etc. These mechanisms can also help avoid unnecessary model updates, which also helps to save radio resources for model exchanging and conserve computational resources.

1. AI/ML Model Update Mechanisms

AI/ML includes processing of data collection, model training, model validation and model inference. Normally, a well-trained model is trained based on massive input data, which also need to be validated based on another set of data which is not used for training. In wireless system, the environment (including traffic, radio, accessed number of UE, etc) may be various. It's hard to train a comprehensive AI/ML model which can suit for all scenarios just based on several rounds of training or initial offline training. To maintain a good accuracy level of prediction results for which network can trust, it is necessary for the network node/UE with model inference functionality to get an up-to-date AI/ML model which can accommodate to the changes in the environment.

Hence, the network node/UE with model training functionality should continuously train AI/ML based on feedbacks collected from Actor (which is distributed in the network, e.g., UE, gNB-DU, gNB-CU, etc), regardless of online (e.g., RL) or offline (e.g., supervised learning, unsupervised learning) training mechanism used. The updated/re-trained/re-tuned AI/ML model should be further deployed to network nodes/UE with model inference functionality.

Several issues should be considered when defining model update mechanism:

1. Considering AI/ML model normally has a large size, it is important to avoid unnecessary deployment and frequent model update 2. The purpose of updating AI/ML model is to provide better performance and output with higher accuracy to the system. One deployed model may be outdated or not suitable for current environment. This requires the Model training function either to update the model based on performance feedback from Actor or based on other mechanisms.

3. Model update and synchronization for federated learning. When model training and model inference are deployed at different locations in the network, federated learning can be considered. In previous proposals, one central trained model is located at central server (e.g., CN or RAN, respectively) and another local retrained model is located at local nodes (e.g., RAN or UE, respectively). Certain interaction and synchronization of trained models between central server and local nodes are required. For federated learning, the central server may also selectively update the model to the local nodes, considering workload or other impacts.

The present disclosure provides various embodiments to support model update between network nodes with model training (e.g., OAM/CN for model deployment to RAN, RAN for model deployment to UE) and network nodes/UE with model inference (e.g., RAN for model deployment from CN/OAM, UE for model deployment from RAN).

1.1. Timer Based Model Update Trigger

In this embodiment, the model update is triggered from model training (e.g., OAM/CN or RAN) based on the configured timer. The timer can either be configured and running at network nodes with model training or network nodes/UE with model inference.

1.1.1. Model Training Side

If the timer is running at model training side, the timer can be used to: indicate the duration of one AI/ML model's update/re-train; the model is retrained based on data collected during this period; and/or trigger model update and send updated AI/ML model to network nodes/UE with model inference.

1.1.2. Model Inference Side

If the timer is running at model inference side, the timer can be used to: trigger model update and send model update request message from NG-RAN to OAM/CN or from UE to NG-RAN. Under this scenario, the timer is configured from CN/OAM to NG-RAN via NG interface or E1 interface; or the timer is configured from NG-RAN to UE via Uu interface as part of model configuration in Machine Learning Configuration message.

An example for the model training side and/or model inference side embodiments is shown below:

ModelUpdateConfigToAddModList

The IE ModelUpdateConfigToAddModList concerns a list of model update configurations to add or modify, with for each entry the modelIdentifier and the associated trigger condition/threshold.'

Network may configure or set different timer according to different use cases or to different models for different use cases.

To support federated learning, a central server (CN/OAM or RAN) is allowed to set the same timer to all local nodes (RAN or UE) to support synchronized model training. If the central server (CN/OAM or RAN) sets different timers to different local nodes (RAN or UE), asynchronized model training is considered for federated averaging.

Together with the updated model, a model ID is required to be encoded in the model update message from OAM/CN to RAN or in RRC reconfiguration (from NG-RAN to UE).

1.2. Accuracy Level of AI/ML Model Trigger

In this embodiment, the model update can be triggered by accuracy level of one AI/ML model. The accuracy level can be calculated by comparing predicted results with the real value at the model training node during validation or testing. If the model accuracy level is higher than that of the pervious deployed model, the model training node (e.g., CN/OAM or RAN) can provide this updated model to model inference (RAN or UE). The model training node may also calculate the accuracy level gain comparing accuracy level of current model and previous one. Model update is only triggered if the accuracy gain is higher than the threshold.

1.3. Confidence Level of AI/ML Model Trigger

In this embodiment, the model update can be triggered by confidence level of one AI/ML model. Confidence level is calculated at the model inference node, by comparing prediction results and the real value (real future input to model inference). If the confidence level is lower than certain threshold, a model update should be triggered to avoid using the wrong/inaccurate predicted results/actions. This could also be triggered by either network or UE.

1.3.1. Configured Confidence Threshold

In this embodiment, the OAM/CN or the NG-RAN configures a threshold of confidence level to NG-RAN or UE via AI/ML model update configuration (as part of model management). If the confidence level calculated by network nodes/UE for model inference (e.g., RAN or UE) is lower than the confidence level threshold, the RAN/UE should

```
  MachineLearningConfiguration ::= SEQUENCE {
   criticalExtensions                        CHOICE {
     machineLearningConfiguration              MachineLearningConfiguration-IEs,
                                                 machineLearningModelUpdateConfiguration
MachineLearningModelUpdateConfiguration,
     criticalExtensionsFuture                  SEQUENCE { }
    }
  }
  MachineLearningModelUpdateConfiguration ::=          SEQUENCE {
     modelUpateConfigToRemoveList                    ModelUpateConfigToRemoveList
OPTIONAL,
  modelUpdateConfigToAddModList                  ModelUpdateConfigToAddModList
  OPTIONAL,
  }
  ModelUpdateReconfigToAddModList-rxy ::= SEQUENCE (SIZE (1..maxNrofModel-
rxy)) OF ModelUpdateConfigToAddMod-rxy
  ModelUpdateConfigToAddMod
  {
   modelIdentifier                           ModelIdentifier   MANDATORY,
  updateTimer                              ENUMERATED {sf50, sf100, sf200,..,infinity} OPTIONAL,
   ...
}
```

send a model update request to the network nodes with model training functionality (e.g., CN/OAM or RAN). Upon receiving the model update request, an updated model should be sent to the requested node. Normally, the confidence level is between [0,1], here, for example, an integer value is used to represent 10 times of exact loss value.

An example of model update configuration from NG-RAN to UE is shown as below:

```
ModelUpdateConfigToAddMod
{
  modelIdentifier                    ModelIdentifier     MANDATORY,
confidenceLevelThreshold              ENUMERATED {1, 2, 3,.., 10} OPTIONAL,
  ...
}
```

1.3.2. Network Node Triggering

In this embodiment, network nodes with model training (e.g., CN/OAM or RAN) can trigger model update based on received confidence level report from model inference (e.g., RAN or UE). If the confidence level in the report is lower than the value expected at the model training, network nodes can send a new up-to-date model to its model inference node (e.g., RAN or UE).

The network may configure or set different confidence level threshold according to different use cases. For example, UE trajectory normally requires a high accuracy, while some non-real-time prediction can have a relax threshold.

1.4. Performance Feedback Trigger

In this embodiment, the model update is triggered by performance feedback (e.g., UE measurement report, performance indicator from network node or its neighbor nodes, etc). The model will only be updated when the performance feedback shows a poor performance or performance down-gradation.

In some embodiments, the Actor who performs predicted results/actions provides performance feedback (e.g., UE measurement report, SON/MDT measurement report, etc) to the network. Based on the performance feedback, the network nodes with model training can provide an updated AI/ML model to network nodes/UE with model inference to optimize the predicted results.

Additionally or alternatively, the Actor can compare its previous performance and its performance after taking predicted results/actions. If the performance (e.g., throughput, SINR, energy cost, etc) is down-graded, the Actor can directly send a simple feedback indicator "performance down-graded" to the network node with model training. Upon receiving this "down-graded" feedback indicator, OAM/CN or RAN can provide an updated model to the model inference node, e.g., RAN or UE, respectively. An example of this "performance indicator" in Uu interface is shown as below:

```
MachineLearningReport-IEs ::=              SEQUENCE {
  serviceType                        ENUMERATED {default, positioning, V2X, spare5, spare4,
spare3, spare2, spare1}                        OPTIONAL,
  modelUpdate                        OCTET STRING (SIZE(1..8000))        OPTIONAL,
  modelBias                        ENUMERATED {poor-bias, less-poor, no-bias, spare5, spare4,
spare3, spare2, spare1}            OPTIONAL,
  modelVariance                      INTEGER (0,...,100)                 OPTIONAL,
  predictionResult                   PredictionResult                    OPTIONAL,
  confidenceLevel                      ENUMERATED {0, 1, 2, ..., 10}          OPTIONAL,
  performanceIndicator                 ENUMERATED {improved, downgraded, nochange}
  OPTIONAL,
      lateNonCriticalExtension                                              OCTET STRING
OPTIONAL,
      nonCriticalExtension               SEQUENCE{ }                        OPTIONAL
  }
```

This performance indicator can also be added in UE MDT measurement report, L2 measurement report, etc.

The performance feedback to trigger model update can be different across use cases.

For example, for handover mobility use case, this could be handover failure rate or other handover events; for energy saving, this could be an increase of energy consumption of ES-Cell or neighbor cell; for load balancing, it could be the network node's average packet delay/throughput or a percentage of UE's packet delay/throughput; for CSI feedback, it could be system or UE throughput.

1.5. Model Loss Trigger

In this embodiment, the model update is triggered based on the model loss. This embodiment is mainly suitable for federated learning, e.g., between OAM/CN and NG-RAN; between NG-RAN and UE. A certain threshold of loss is configured by central node during model deployment and configuration. However, when a model is first deployed to a node (RAN or UE), it is still possible it may not be converged and need some time to reduce model loss by taking several rounds of re-training. Hence, it is also proposed a fix number of epochs or a given period is configured together with loss.

The output of loss function may be various based on the exact algorithm, the example integer can also be replaced by dB or other unit per use case.

Alternatively, to avoid specifying algorithms, a normalized value is proposed to calculate the loss gain. The loss gain is the relative percentage of loss improvement compared with last calculated loss of the model. Normally, the gain value is between [0,1], here an integer value is used to represent 10 times of exact gain value.

1.5.1. RAN-UE Model Update

When the loss of a trained model at UE is larger than the configured loss threshold, the local node (RAN or UE) should trigger a request to the central server (CN/OAM or RAN) via NG/E1 or Uu interface (e.g., Machine Learning Model Update Request), asking for a model update. An example of RAN-UE model update configuration triggered by loss is shown as below:

```
ModelUpdateConfigToAddMod
{
modelIdentifier          ModelIdentifier     MANDATORY,
lossStartTimeOffset      ENUMERATED {sf10, sf20, sf50,..} OPTIONAL,
lossStartEpoch           ENUMERATED {10, 20, 30,..} OPTIONAL,
lossThreshold            ENUMERATED {1, 2, 3,.., 10} OPTIONAL,
lossGain                 ENUMERATED {1, 2, 3,.., 10} OPTIONAL,
   ...
}
```

1.5.2. Central Node

Additionally or alternatively, the model update can also be managed by a central server, if the loss weights of local nodes (e.g., RAN or UE) are reported to central node (e.g., OAM/CN or RAN). Based on received model loss weight, the central node may know whether this AI/ML model need to be refined/updated. The loss in the model report can also be replaced by some categorized level of loss (e.g., high loss, low loss, etc.). Based on the report, whether to update the model or not is decided by the central server—The model update may only be triggered if the central node receives a high loss in the model report from local nodes.

An example of loss report to be added in an ML report is shown below:

```
  MachineLearningReport-IEs ::=          SEQUENCE {
  serviceType                         ENUMERATED {default, positioning, V2X, spare5, spare4,
spare3, spare2, spare1}                   OPTIONAL,
  modelUpdate                         OCTET STRING (SIZE(1..8000))       OPTIONAL,
  modelBias                         ENUMERATED {poor-bias, less-poor, no-bias, spare5, spare4,
spare3, spare2, spare1}            OPTIONAL,
  modelVariance                         INTEGER (0,...,100)              OPTIONAL,
  predictionResult                    PredictionResult                 OPTIONAL,
  confidenceLevel                       ENUMERATED {0, 1, 2, ..., 10}      OPTIONAL,
  loss                             INTEGER (0, 1, .., 9, 10)
  OPTIONAL,
       lateNonCriticalExtension                                          OCTET STRING
OPTIONAL,
     nonCriticalExtension                SEQUENCE{ }                       OPTIONAL
  }
```

Instead of model loss, the model variance and model bias can also be used as trigger event for model update.

1.6. Multiple Triggers

One AI/ML model may also be configured with multiple trigger condition. In this embodiment, a modelUpdateTriggerCategory may include all possibilities of a trigger condition. An example is shown below:

ModelUpdateTriggerToAddMod

```
ModelUpdateConfigToAddMod
  {
    modelIdentifier                    ModelIdentifier      MANDATORY,
  modelUpdateTriggerCategory                ENUMERATED {timer, accuracylevel,
confidencelevel,performancefeedback, loss, spare3, spare2, spare1} OPTIONAL,
  modelUpdateTriggerToAddModList            ModelUpdateTriggerToAddModList
    ...
  }
  ModelUpdateTriggerToAddModList-rxy      ::=     SEQUENCE     (SIZE     (1..
maxNrofModelUpdateCat-rxy)) OF ModelUpdateTriggerToAddMod-rxy
  ModelUpdateTriggerToAddMod
  {
  updateTimer                    ENUMERATED {sf10, sf20, sf50,.., infinity} OPTIONAL,
  confidenceLevelThreshold             ENUMERATED {1, 2, 3,.., 10} OPTIONAL,
  lossStartTimeOffset                ENUMERATED {sf10, sf20, sf50,..} OPTIONAL,
  lossStartEpoch                 ENUMERATED {10, 20, 30,..} OPTIONAL,
  lossThreshold                  ENUMERATED {1, 2, 3,.., 10} OPTIONAL,
  lossGain                     ENUMERATED {1, 2, 3,.., 10} OPTIONAL,
  ...
  }
```

Systems and Implementations

Figure 15:
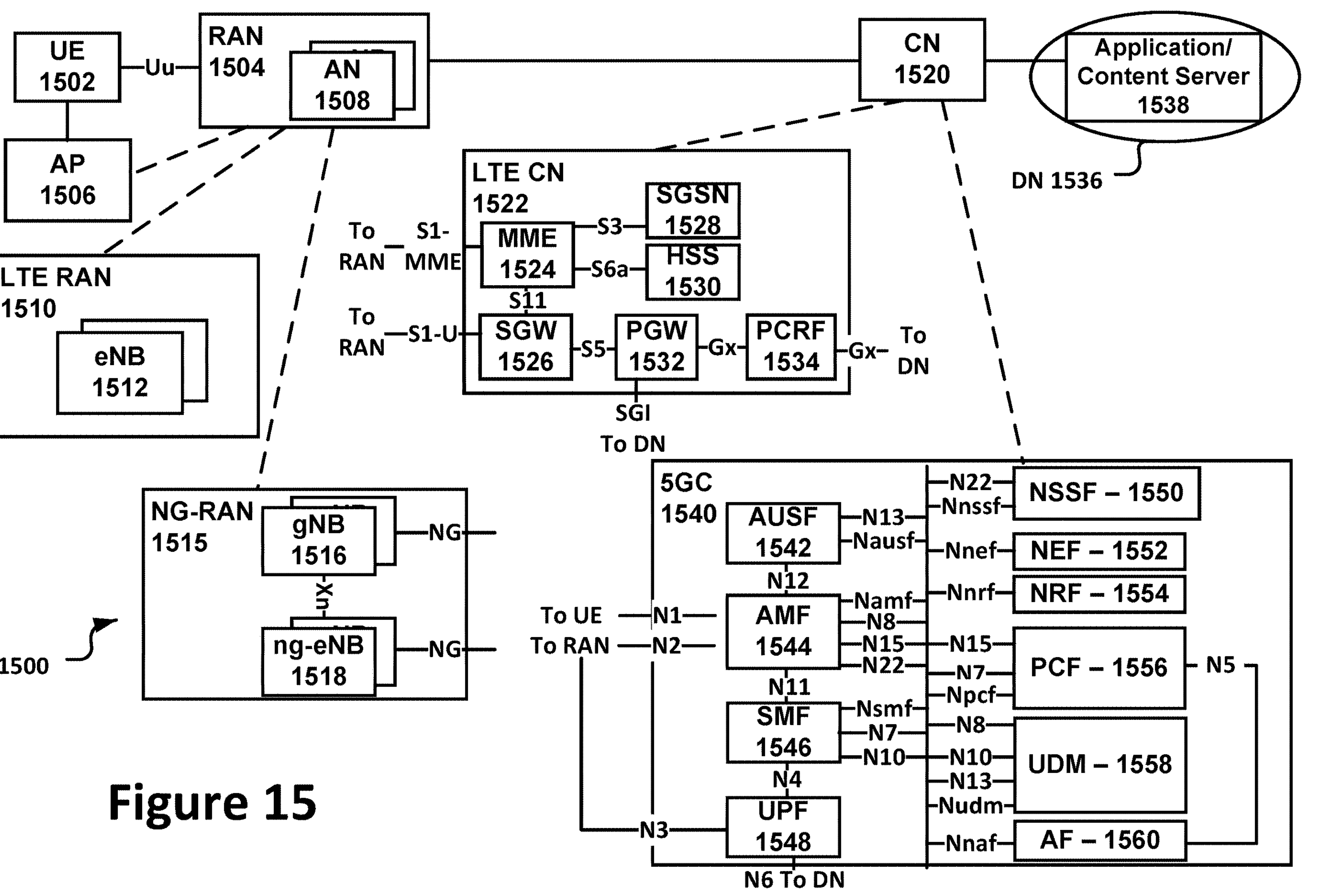
FIG. 15 illustrates a network in accordance with various embodiments.
Figure 16:
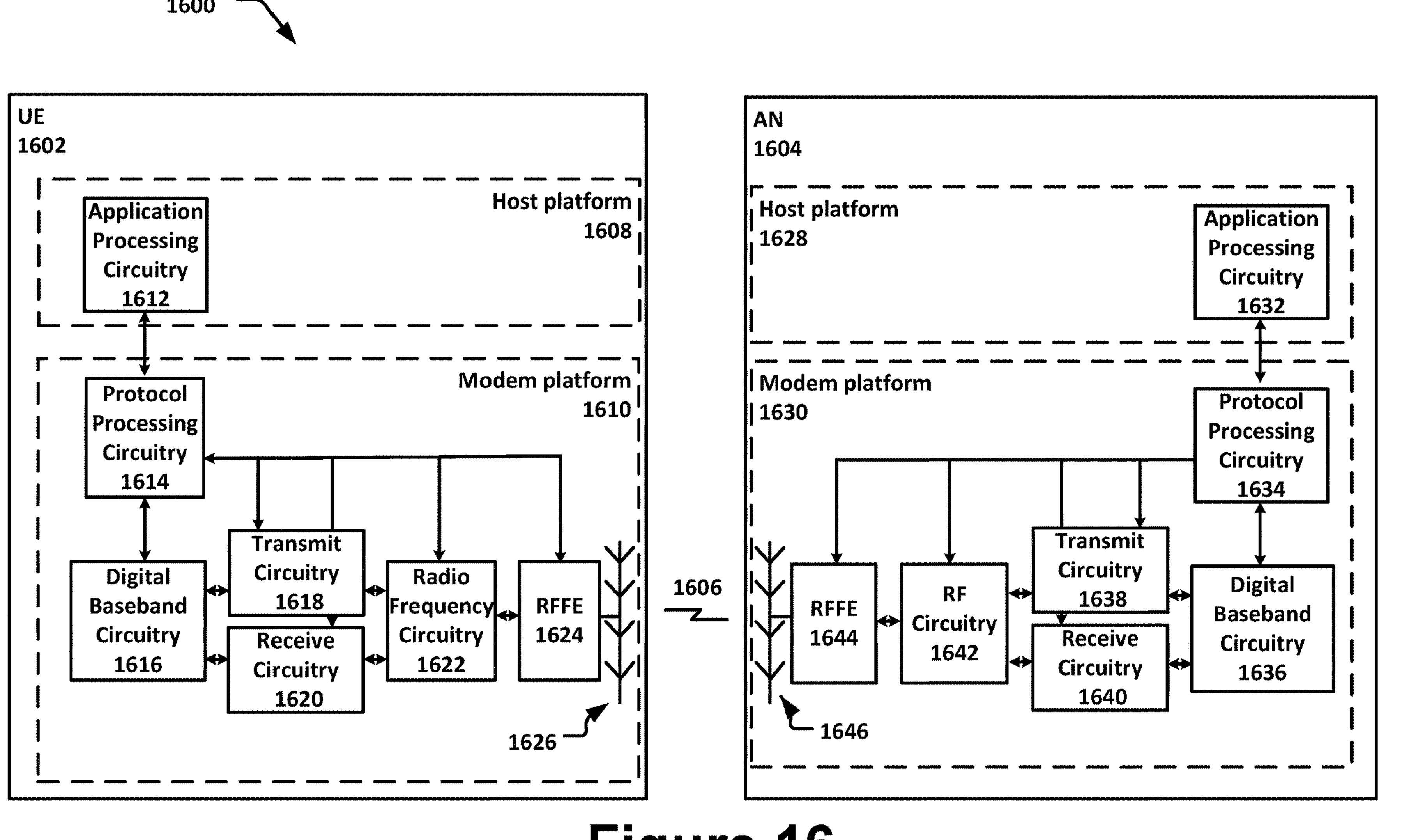
FIG. 16 schematically illustrates a wireless network 1600 in accordance with various embodiments.
Figure 17:
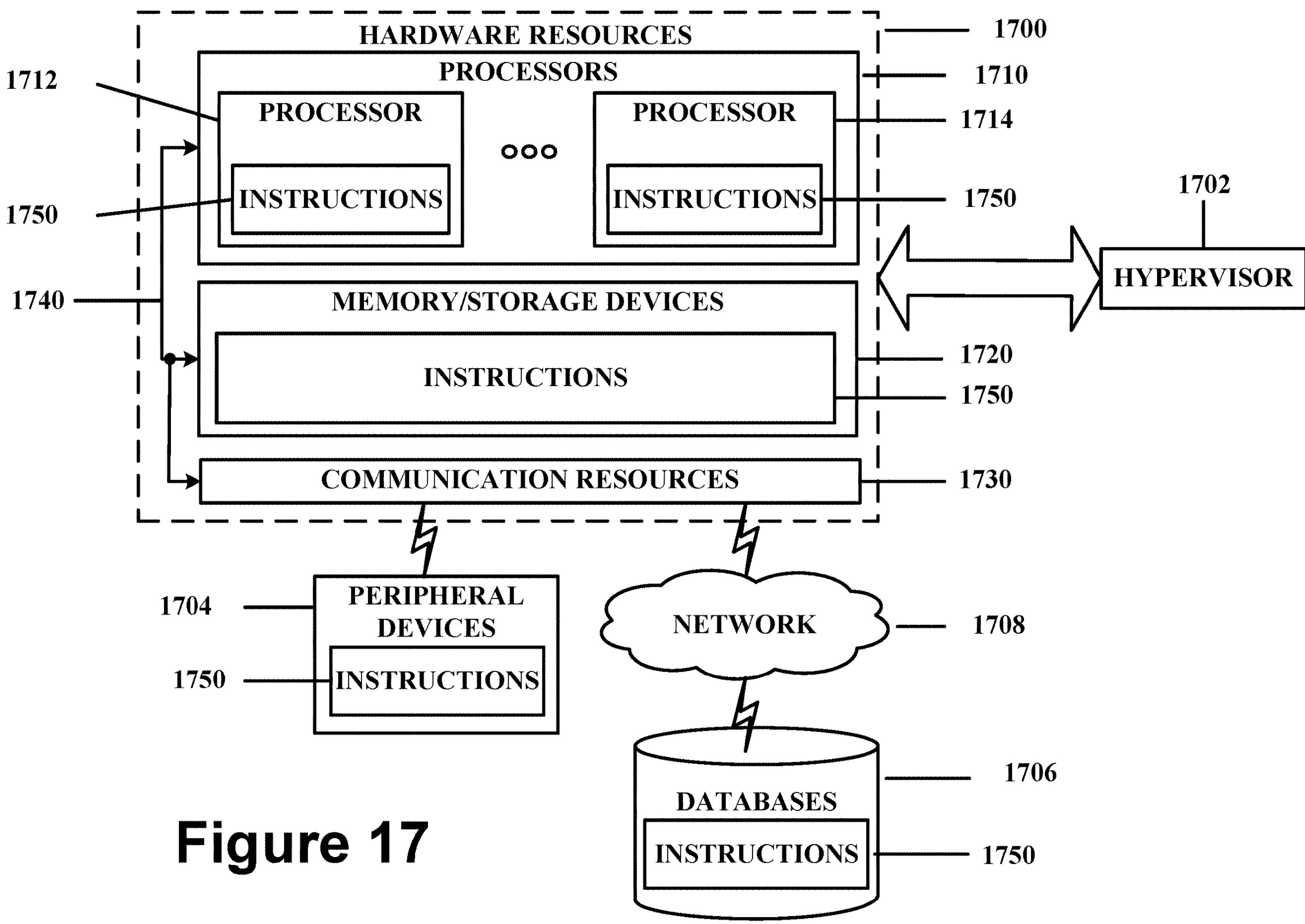
FIG. 17 is a block diagram illustrating components, according to some examples of embodiments, able to read instructions from a machine-readable or computer-readable medium (e.g., a non-transitory machine-readable storage medium) and perform any one or more of the methodologies discussed herein.

FIGS. 15-17 illustrate various systems, devices, and components that may implement aspects of disclosed embodiments.

FIG. 15 illustrates a network 1500 in accordance with various embodiments. The network 1500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1500 may include a UE 1502, which may include any mobile or non-mobile computing device designed to communicate with a RAN 1504 via an over-the-air connection. The UE 1502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1502 may additionally communicate with an AP 1506 via an over-the-air connection. The AP 1506 may manage a WLAN connection, which may serve to offload some/all network traffic from the RAN 1504. The connection between the UE 1502 and the AP 1506 may be consistent with any IEEE 802.11 protocol, wherein the AP 1506 could be a wireless fidelity (Wi-Fi®) router. In some embodiments, the UE 1502, RAN 1504, and AP 1506 may utilize cellular-WLAN aggregation (for example, LWA/LWIP). Cellular-WLAN aggregation may involve the UE 1502 being configured by the RAN 1504 to utilize both cellular radio resources and WLAN resources.

The RAN 1504 may include one or more access nodes, for example, AN 1508. AN 1508 may terminate air-interface protocols for the UE 1502 by providing access stratum protocols including RRC, PDCP, RLC, MAC, and L1 protocols. In this manner, the AN 1508 may enable data/voice connectivity between CN 1520 and the UE 1502. In some embodiments, the AN 1508 may be implemented in a discrete device or as one or more software entities running on server computers as part of, for example, a virtual network, which may be referred to as a CRAN or virtual baseband unit pool. The AN 1508 be referred to as a BS, gNB, RAN node, eNB, ng-eNB, NodeB, RSU, TRxP, TRP, etc. The AN 1508 may be a macrocell base station or a low power base station for providing femtocells, picocells or other like cells having smaller coverage areas, smaller user capacity, or higher bandwidth compared to macrocells.

In embodiments in which the RAN 1504 includes a plurality of ANs, they may be coupled with one another via an X2 interface (if the RAN 1504 is an LTE RAN) or an Xn interface (if the RAN 1504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1504 may each manage one or more cells, cell groups, component carriers, etc. to provide the UE 1502 with an air interface for network access. The UE 1502 may be simultaneously connected with a plurality of cells provided by the same or different ANs of the RAN 1504. For example, the UE 1502 and RAN 1504 may use carrier aggregation to allow the UE 1502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1502 or AN 1508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1504 may be an LTE RAN 1510 with eNBs, for example, eNB 1512. The LTE RAN 1510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1504 may be an NG-RAN 1514 with gNBs, for example, gNB 1516, or ng-eNBs, for example, ng-eNB 1518. The gNB 1516 may connect with 5G-enabled UEs using a 5G NR interface. The gNB 1516 may connect with a 5G core through an NG interface, which may include an N2 interface or an N3 interface. The ng-eNB 1518 may also connect with the 5G core through an NG interface, but may connect with a UE via an LTE air interface. The gNB 1516 and the ng-eNB 1518 may connect with each other over an Xn interface.

In some embodiments, the NG interface may be split into two parts, an NG user plane (NG-U) interface, which carries traffic data between the nodes of the NG-RAN 1514 and a UPF 1548 (e.g., N3 interface), and an NG control plane (NG-C) interface, which is a signaling interface between the nodes of the NG-RAN 1514 and an AMF 1544 (e.g., N2 interface).

The NG-RAN 1514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1502 can be configured with multiple BWPs where each BWP configuration has a different SCS. When a BWP change is indicated to the UE 1502, the SCS of the transmission is changed as well. Another use case example of BWP is related to power saving. In particular, multiple BWPs can be configured for the UE 1502 with different amount of frequency resources (for example, PRBs) to support data transmission under different traffic loading scenarios. A BWP containing a smaller number of PRBs can be used for data transmission with small traffic load while allowing power saving at the UE 1502 and in some cases at the gNB 1516. A BWP containing a larger number of PRBs can be used for scenarios with higher traffic load.

The RAN 1504 is communicatively coupled to CN 1520 that includes network elements to provide various functions to support data and telecommunications services to customers/subscribers (for example, users of UE 1502). The components of the CN 1520 may be implemented in one physical node or separate physical nodes. In some embodiments, NFV may be utilized to virtualize any or all of the functions provided by the network elements of the CN 1520 onto physical compute/storage resources in servers, switches, etc. A logical instantiation of the CN 1520 may be referred to as a network slice, and a logical instantiation of a portion of the CN 1520 may be referred to as a network sub-slice.

In some embodiments, the CN 1520 may be an LTE CN 1522, which may also be referred to as an EPC. The LTE CN 1522 may include MME 1524, SGW 1526, SGSN 1528, HSS 1530, PGW 1532, and PCRF 1534 coupled with one another over interfaces (or "reference points") as shown. Functions of the elements of the LTE CN 1522 may be briefly introduced as follows.

The MME 1524 may implement mobility management functions to track a current location of the UE 1502 to facilitate paging, bearer activation/deactivation, handovers, gateway selection, authentication, etc.

The SGW 1526 may terminate an S1 interface toward the RAN and route data packets between the RAN and the LTE CN 1522. The SGW 1526 may be a local mobility anchor point for inter-RAN node handovers and also may provide an anchor for inter-3GPP mobility. Other responsibilities may include lawful intercept, charging, and some policy enforcement.

The SGSN 1528 may track a location of the UE 1502 and perform security functions and access control. In addition, the SGSN 1528 may perform inter-EPC node signaling for mobility between different RAT networks; PDN and S-GW selection as specified by MME 1524; MME selection for handovers; etc. The S3 reference point between the MME 1524 and the SGSN 1528 may enable user and bearer information exchange for inter-3GPP access network mobility in idle/active states.

The HSS 1530 may include a database for network users, including subscription-related information to support the network entities' handling of communication sessions. The HSS 1530 can provide support for routing/roaming, authentication, authorization, naming/addressing resolution, location dependencies, etc. An S6a reference point between the HSS 1530 and the MME 1524 may enable transfer of subscription and authentication data for authenticating/authorizing user access to the LTE CN 1520.

The PGW 1532 may terminate an SGi interface toward a data network (DN) 1536 that may include an application/content server 1538. The PGW 1532 may route data packets between the LTE CN 1522 and the data network 1536. The PGW 1532 may be coupled with the SGW 1526 by an S5 reference point to facilitate user plane tunneling and tunnel management. The PGW 1532 may further include a node for policy enforcement and charging data collection (for example, PCEF). Additionally, the SGi reference point between the PGW 1532 and the data network 1536 may be an operator external public, a private PDN, or an intra-operator packet data network, for example, for provision of IMS services. The PGW 1532 may be coupled with a PCRF 1534 via a Gx reference point.

The PCRF 1534 is the policy and charging control element of the LTE CN 1522. The PCRF 1534 may be communicatively coupled to the app/content server 1538 to determine appropriate QoS and charging parameters for service flows. The PCRF 1532 may provision associated rules into a PCEF (via Gx reference point) with appropriate TFT and QCI.

In some embodiments, the CN 1520 may be a 5GC 1540. The 5GC 1540 may include an AUSF 1542, AMF 1544, SMF 1546, UPF 1548, NSSF 1550, NEF 1552, NRF 1554, PCF 1556, UDM 1558, and AF 1560 coupled with one another over interfaces (or "reference points") as shown. Functions of the elements of the 5GC 1540 may be briefly introduced as follows.

The AUSF 1542 may store data for authentication of UE 1502 and handle authentication-related functionality. The AUSF 1542 may facilitate a common authentication framework for various access types. In addition to communicating with other elements of the 5GC 1540 over reference points as shown, the AUSF 1542 may exhibit an Nausf service-based interface.

The AMF 1544 may allow other functions of the 5GC 1540 to communicate with the UE 1502 and the RAN 1504 and to subscribe to notifications about mobility events with respect to the UE 1502. The AMF 1544 may be responsible for registration management (for example, for registering UE 1502), connection management, reachability management, mobility management, lawful interception of AMF-related events, and access authentication and authorization. The AMF 1544 may provide transport for SM messages between the UE 1502 and the SMF 1546, and act as a transparent proxy for routing SM messages. AMF 1544 may also provide transport for SMS messages between UE 1502 and an SMSF. AMF 1544 may interact with the AUSF 1542 and the UE 1502 to perform various security anchor and context management functions. Furthermore, AMF 1544 may be a termination point of a RAN CP interface, which may include or be an N2 reference point between the RAN 1504 and the AMF 1544; and the AMF 1544 may be a termination point of NAS (N1) signaling, and perform NAS ciphering and integrity protection. AMF 1544 may also support NAS signaling with the UE 1502 over an N3 IWF interface.

The SMF 1546 may be responsible for SM (for example, session establishment, tunnel management between UPF 1548 and AN 1508); UE IP address allocation and management (including optional authorization); selection and control of UP function; configuring traffic steering at UPF 1548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1544 over N2 to AN 1508; and determining SSC mode of a session. SM may refer to management of a PDU session, and a PDU session or "session" may refer to a PDU connectivity service that provides or enables the exchange of PDUs between the UE 1502 and the data network 1536.

The UPF 1548 may act as an anchor point for intra-RAT and inter-RAT mobility, an external PDU session point of interconnect to data network 1536, and a branching point to support multi-homed PDU session. The UPF 1548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1548 may include an uplink classifier to support routing traffic flows to a data network.

The NSSF 1550 may select a set of network slice instances serving the UE 1502. The NSSF 1550 may also determine allowed NSSAI and the mapping to the subscribed S-NSSAIs, if needed. The NSSF 1550 may also determine the AMF set to be used to serve the UE 1502, or a list of candidate AMFs based on a suitable configuration and possibly by querying the NRF 1554. The selection of a set of network slice instances for the UE 1502 may be triggered by the AMF 1544 with which the UE 1502 is registered by interacting with the NSSF 1550, which may lead to a change of AMF. The NSSF 1550 may interact with the AMF 1544 via an N22 reference point; and may communicate with another NSSF in a visited network via an N31 reference point (not shown). Additionally, the NSSF 1550 may exhibit an Nnssf service-based interface.

The NEF 1552 may securely expose services and capabilities provided by 3GPP network functions for third party, internal exposure/re-exposure, AFs (e.g., AF 1560), edge computing or fog computing systems, etc. In such embodiments, the NEF 1552 may authenticate, authorize, or throttle the AFs. NEF 1552 may also translate information exchanged with the AF 1560 and information exchanged with internal network functions. For example, the NEF 1552 may translate between an AF-Service-Identifier and an internal 5GC information. NEF 1552 may also receive information from other NFs based on exposed capabilities of other NFs. This information may be stored at the NEF 1552 as structured data, or at a data storage NF using standardized interfaces. The stored information can then be re-exposed by the NEF 1552 to other NFs and AFs, or used for other purposes such as analytics. Additionally, the NEF 1552 may exhibit an Nnef service-based interface.

The NRF 1554 may support service discovery functions, receive NF discovery requests from NF instances, and provide the information of the discovered NF instances to the NF instances. NRF 1554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1554 may exhibit the Nnrf service-based interface.

The PCF 1556 may provide policy rules to control plane functions to enforce them, and may also support unified policy framework to govern network behavior. The PCF 1556 may also implement a front end to access subscription information relevant for policy decisions in a UDR of the UDM 1558. In addition to communicating with functions over reference points as shown, the PCF 1556 exhibit an Npcf service-based interface.

The UDM 1558 may handle subscription-related information to support the network entities' handling of communication sessions, and may store subscription data of UE 1502. For example, subscription data may be communicated via an N8 reference point between the UDM 1558 and the AMF 1544. The UDM 1558 may include two parts, an application front end and a UDR. The UDR may store subscription data and policy data for the UDM 1558 and the PCF 1556, and/or structured data for exposure and application data (including PFDs for application detection, application request information for multiple UEs 1502) for the NEF 1552. The Nudr service-based interface may be exhibited by the UDR 221 to allow the UDM 1558, PCF 1556, and NEF 1552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1558 may exhibit the Nudm service-based interface.

The AF 1560 may provide application influence on traffic routing, provide access to NEF, and interact with the policy framework for policy control.

In some embodiments, the 5GC 1540 may enable edge computing by selecting operator/3$^{rd}$ party services to be geographically close to a point that the UE 1502 is attached to the network. This may reduce latency and load on the network. To provide edge-computing implementations, the 5GC 1540 may select a UPF 1548 close to the UE 1502 and execute traffic steering from the UPF 1548 to data network 1536 via the N6 interface. This may be based on the UE subscription data, UE location, and information provided by the AF 1560. In this way, the AF 1560 may influence UPF (re)selection and traffic routing. Based on operator deployment, when AF 1560 is considered to be a trusted entity, the network operator may permit AF 1560 to interact directly with relevant NFs. Additionally, the AF 1560 may exhibit an Naf service-based interface.

The data network 1536 may represent various network operator services, Internet access, or third party services that may be provided by one or more servers including, for example, application/content server 1538.

FIG. 16 schematically illustrates a wireless network 1600 in accordance with various embodiments. The wireless network 1600 may include a UE 1602 in wireless communication with an AN 1604. The UE 1602 and AN 1604 may be similar to, and substantially interchangeable with, like-named components described elsewhere herein.

The UE 1602 may be communicatively coupled with the AN 1604 via connection 1606. The connection 1606 is illustrated as an air interface to enable communicative coupling, and can be consistent with cellular communications protocols such as an LTE protocol or a 5G NR protocol operating at mmWave or sub-6 GHz frequencies.

The UE 1602 may include a host platform 1608 coupled with a modem platform 1610. The host platform 1608 may include application processing circuitry 1612, which may be coupled with protocol processing circuitry 1614 of the modem platform 1610. The application processing circuitry 1612 may run various applications for the UE 1602 that source/sink application data. The application processing circuitry 1612 may further implement one or more layer operations to transmit/receive application data to/from a data network. These layer operations may include transport (for example UDP) and Internet (for example, IP) operations The protocol processing circuitry 1614 may implement one or more of layer operations to facilitate transmission or reception of data over the connection 1606. The layer operations implemented by the protocol processing circuitry 1614 may include, for example, MAC, RLC, PDCP, RRC and NAS operations.

The modem platform 1610 may further include digital baseband circuitry 1616 that may implement one or more layer operations that are "below" layer operations performed by the protocol processing circuitry 1614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1610 may further include transmit circuitry 1618, receive circuitry 1620, RF circuitry 1622, and RF front end (RFFE) 1624, which may include or connect to one or more antenna panels 1626. Briefly, the transmit circuitry 1618 may include a digital-to-analog converter, mixer, intermediate frequency (IF) components, etc.; the receive circuitry 1620 may include an analog-to-digital converter, mixer, IF components, etc.; the RF circuitry 1622 may include a low-noise amplifier, a power amplifier, power tracking components, etc.; RFFE 1624 may include filters (for example, surface/bulk acoustic wave filters), switches, antenna tuners, beamforming components (for example, phase-array antenna components), etc. The selection and arrangement of the components of the transmit circuitry 1618, receive circuitry 1620, RF circuitry 1622, RFFE 1624, and antenna panels 1626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1614 may include one or more instances of control circuitry (not shown) to provide control functions for the transmit/receive components.

A UE reception may be established by and via the antenna panels 1626, RFFE 1624, RF circuitry 1622, receive circuitry 1620, digital baseband circuitry 1616, and protocol processing circuitry 1614. In some embodiments, the antenna panels 1626 may receive a transmission from the AN 1604 by receive-beamforming signals received by a plurality of antennas/antenna elements of the one or more antenna panels 1626.

A UE transmission may be established by and via the protocol processing circuitry 1614, digital baseband circuitry 1616, transmit circuitry 1618, RF circuitry 1622, RFFE 1624, and antenna panels 1626. In some embodiments, the transmit components of the UE 1604 may apply a spatial filter to the data to be transmitted to form a transmit beam emitted by the antenna elements of the antenna panels 1626.

Similar to the UE 1602, the AN 1604 may include a host platform 1628 coupled with a modem platform 1630. The host platform 1628 may include application processing circuitry 1632 coupled with protocol processing circuitry 1634 of the modem platform 1630. The modem platform may further include digital baseband circuitry 1636, transmit circuitry 1638, receive circuitry 1640, RF circuitry 1642, RFFE circuitry 1644, and antenna panels 1646. The components of the AN 1604 may be similar to and substantially interchangeable with like-named components of the UE 1602. In addition to performing data transmission/reception as described above, the components of the AN 1608 may perform various logical functions that include, for example, RNC functions such as radio bearer management, uplink and downlink dynamic radio resource management, and data packet scheduling.

FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1700 including one or more processors (or processor cores) 1710, one or more memory/storage devices 1720, and one or more communication resources 1730, each of which may be communicatively coupled via a bus 1740 or other interface circuitry. For embodiments where node virtualization (e.g., NFV) is utilized, a hypervisor 1702 may be executed to provide an execution environment for one or more network slices/sub-slices to utilize the hardware resources 1700.

The processors 1710 may include, for example, a processor 1712 and a processor 1714. The processors 1710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1720 may include main memory, disk storage, or any suitable combination thereof. The memory/storage devices 1720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1730 may include interconnection or network interface controllers, components, or other suitable devices to communicate with one or more peripheral devices 1704 or one or more databases 1706 or other network elements via a network 1708. For example, the communication resources 1730 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable media.

Example Procedures

In some embodiments, the electronic device(s), network (s), system(s), chip(s) or component(s), or portions or implementations thereof, of FIGS. 15-17, or some other figure herein, may be configured to perform one or more processes, techniques, or methods as described herein, or portions thereof.

One such process is depicted in FIG. 18, which may be performed by a network function such as a network data analytics function (NWDAF), operation administration and maintenance (OAM) function, or location management function (LMF). For example, the process 1800 may include, at 1805, Receiving, from a next-generation NodeB (gNB), a request for location information for a user equipment (UE). The process further includes, at 1810, retrieving UE measurement report information from a memory. The process further includes, at 1815, determining, using a positioning artificial intelligence (AI) or machine learning (ML) model, the location information for the UE based on the UE measurement report information and the request for location information, wherein the location information for the UE includes an indication of a predicted location for the UE. The process further includes, at 1820, encoding a message for transmission to the gNB that includes an indication of the determined location information for the UE.

Another such process is illustrated in FIG. 19. In this example, the process 1900 includes, at 1905, receiving, from a next-generation NodeB (gNB), a request for location information for a user equipment (UE). The process further includes, at 1910, determining, using a positioning artificial intelligence (AI) or machine learning (ML) model, the location information for the UE based on UE measurement report information and the request for location information wherein the location information for the UE includes an indication of a predicted location for the UE. The process further includes, at 1915, encoding a message for transmission to the gNB that includes an indication of the determined location information for the UE.

Another such process is illustrated in FIG. 20, which may be performed by a gNB. In this example, the process 2000 includes, at 2005, encoding, for transmission to a network function, a request for location information for a user equipment (UE). The process further includes, at 2010, receiving, from the network function, the location information for the UE, wherein the location information for the UE includes an indication of a predicted location for the UE. The process further includes, at 2015, determining configuration information that includes an indication of a combination of candidate handover cells and respective priorities for the candidate handover cells. The process further includes, at 2020, encoding, for transmission to the UE, a message that includes the configuration information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include NG-RAN can generate a group of predicted candidate target cells for handover according to the predicted UE location information.

Example 2 may include the NG-RAN in example 1 or some other example herein, wherein requests UE current/future location information from OAM/CN or LMF.

Example 3 may include the NG-RAN in example 1 or some other example herein, wherein receives UE current/future location information from UE report.

Example 4 may include the OAM/CN/LMF sends the predicted future UE's location information to NG-RAN in example 1.

Example 5 may include the group of target cells in example 1 or some other example herein, wherein includes handover configuration, handover execution timestamp and priority of each cell.

Example 6 may include the source gNB in example 1 or some other example herein, wherein sends the handover request together with the handover execution timestamp to target candidate gNBs.

Example 7 may include the source gNB in example 1 or some other example herein, wherein configures UE with the combination/list of cells with handover execution timestamp and the corresponding priority.

Example 8 may include the UE in example 7 or some other example herein wherein selects handover target cell according to the priority and execute handover at the execution timestamp.

Example 9 may include the UE in example 7 or some other example herein, wherein may delete the candidate cell from the list if the execution timestamp expires.

Example 10 may include the UE in example 7 or some other example herein, wherein may continuously select the highest priority candidate cell from the remaining list if handover is failed.

Example 11 may include the NG-RAN in example 1 or some other example herein, wherein selects UE(s) to request future location information as in example 2 according to UE speed.

Example 12 may include the NG-RAN in example 1 or some other example herein, wherein selects UE(s) to perform AI/ML based mobility enhancement as in example 2 based on statistic of mobility events.

Example 13 may include the NG-RAN in example 1 or some other example herein, wherein selects UE(s) to perform AI/ML based mobility enhancement as in example 2 based on UE information.

Example 14 may include NG-RAN in example 1 or some other example herein, wherein selects UE(s) to perform AI/ML based mobility enhancement as in example 2 based on UE device type or environment.

Example 15 may include if UE is predicted with slow moving, sit in the cell border, the source gNB in example 1 decides not to perform handover.

Example 16 may include the network in example 1 or some other example herein, wherein collects and reports the mobility events for each UE independently.

Example 17 may include a method of a NG-RAN node, the method comprising:

receiving predicted UE location information associated with a UE; and generating a set of one or more predicted candidate target cells for the UE based on the predicted UE location information.

Example 18 may include the method of example 17 or some other example herein, wherein the predicted UE location information is received from a OAM, a CN, or an LMF.

Example 19 may include the method of example 17 or some other example herein, wherein the predicted UE location information is received from the UE.

Example 20 may include the method of example 17-19 or some other example herein, further comprising encoding, for transmission, a request for the predicted UE location information, wherein the predicted UE location information is received responsive to the request.

Example 21 may include the method of example 17-20 or some other example herein, further comprising generating a handover configuration that includes the set of predicted candidate target cells and a handover execution timestamp and/or a priority of individual cells of the set of predicted candidate target cells.

Example 22 may include the method of example 21 or some other example herein, further comprising encoding the handover configuration for transmission to the UE.

Example 23 may include the method of example 17-22 or some other example herein, wherein the NG-RAN node is a source gNB, and wherein the method further comprises encoding a handover request for transmission to a target gNB, wherein the handover request includes a handover execution timestamp.

Example 24 may include the method of example 17-23 or some other example herein, further comprising sending a request to the UE for the predicted UE location information based on a speed of the UE a statistic of mobility events, a UE device type, and/or a UE environment.

Example 25 may include the method of example 17-24 or some other example herein, wherein the predicted UE location information is determined based on an artificial intelligence and/or machine learning (AI/ML) model.

Example 26 may include a method of a UE, the method comprising:

receiving a handover configuration that includes one or more predicted target cells and at least one of a handover execution timestamp or a priority for respective cells of the one or more predicted target cells; and executing a handover to a target cell of the one or more predicted target cells based on the handover configuration.

Example 27 may include the method of example 26 or some other example herein, wherein the handover is executed at a time indicated by the handover execution timestamp associated with the target cell.

Example 28 may include the method of example 26-27 or some other example herein, further comprising selecting the target cell from the one or more predicted target cells based on the respective priorities.

Example 29 may include the method of example 26-28 or some other example herein, further comprising removing a first predicted target cell of the one or more predicted target cells from consideration for the handover based on expiration of the handover execution timestamp associated with the first predicted target cell.

Example 30 may include the method of example 26-29 or some other example herein, further comprising, upon failure of the handover to the target cell, selecting another target cell from the one or more predicted candidate target cells based on the associated priority.

Example 31 may include the method of example 26-30 or some other example herein, further comprising obtaining predicted UE location information for the UE and providing the predicted UE location information to a gNB.

Example 32 may include the method of example 31 or some other example herein, wherein the handover configuration is based on the predicted UE location information.

Example 33 may include the method of example 31-32 or some other example herein, wherein the predicted UE location information is obtained and/or provided responsive to a request from the gNB.

Example 34 may include the method of example 31-33 or some other example herein, wherein the predicted UE location information is obtained using an artificial intelligence and/or machine learning (AI/ML) model.

Example Q1 may include NG-RAN node should configure ML model training and inference configuration for defining how UE trains the AI/ML model, e.g. sending Model training configuration to the UE.

Example Q2 may include NG-RAN node in Example Q1 or some other example herein, wherein should configure whether the UE can perform training/re-training via RRC signaling, e.g. Training Indicator.

Example Q3 may include NG-RAN node in Example Q1 or some other example herein, wherein should configure whether the UE can use its private AI/ML model via RRC signaling, e.g. an indicator of private model training.

Example Q4 may include NG-RAN node in Example Q1 or some other example herein, wherein should configure model training configuration to the UE, including optimizer, loss (function), metrics, loss weight, accuracy level, steps per execution, aggregate bits, etc.

Example Q5 may include the UE in Example Q1 or some other example herein, wherein should report the evaluation results, where model training is following configuration in Example 4, through RRC messages (e.g. via Training Report in Machine learning Report or Model update request, etc).

Example Q6 may include NG-RAN node in Example Q1 or some other example herein, wherein further indicates the UE in Example 5 whether the model is well-trained and can be used for prediction/decision making by sending a training feedback via RRC message.

Example Q7 may include upon receiving an ACK training feedback in Example Q6 or some other example herein, wherein from NG-RAN node, the UE in Example Q5 can use the model trained/retrained by itself for decision making/prediction.

Example Q8 may include upon receiving a NACK training feedback in Example 6 or some other example herein, wherein from NG-RAN node, the UE in Example Q5 need to further train/re-train the AI/ML model, and repeat example Q5 and example Q6.

Example Q9 may include NG-RAN node in Example 1 or some other example herein, wherein may also configure the model training threshold, indicating when the AI/ML is well-trained, to the UE together with model training configuration in Example Q4.

Example Q10 may include the training threshold is met, the UE in Example Q1 or some other example herein, wherein should provide a training complete feedback to the network.

Example Q11 may include the UE may request model downloading from the NG-RAN node in Example 1 or some other example herein, wherein by indicating the interested service or requested model to the network via RRC message.

Example Q12 may include the NG-RAN node in Example Q11 or some other example herein, wherein should also configure the required input/output of AI/ML model when UE in Example Q1 requests model download from itself.

Example Q13 may include the UE in Example Q11 or some other example herein, wherein may further re-train the AI/ML model downloaded from NG-RAN, following Example Q1 to Example Q10.

Example Q14 may include a method of a UE, the method comprising:

receiving, from a NG-RAN node, a model training and inference configuration to indicate information for the UE to train an artificial intelligence (AI) and/or machine learning (ML) (AI/ML) model; and training the AI/ML model based on the configuration.

Example Q15 may include the method of Example Q14 or some other example herein, further comprising receiving, from the NG-RAN node, a training indicator to indicate whether the UE is permitted to perform training/re-training of the AI/ML model.

Example Q16 may include method of Example Q14-Q15 or some other example herein, further comprising receiving, from the NG-RAN node an indication of whether the UE is permitted to use a private AI/ML model.

Example Q17 may include the method of example Q14-Q16 or some other example herein, wherein the configuration, the training indicator, and/or the indicator are received via RRC signaling.

Example A01 includes a method comprising: model update between network nodes triggered by one of or multiple trigger conditions (e.g., timer, accuracy level, confidence level, performance feedback, and loss of AI/ML model).

Example A02 includes a new message is used to configure machine learning update configuration from RAN to UE.

Example A03 includes a new message is used to configure machine learning update configuration from OAM/CN to RAN.

Example A04 includes the method of example A01 and/or some other example(s) herein, wherein the timer is configured by the network nodes who deploys AI/ML model to other network nodes, and upon the configured timer is approaching, UE or RAN may send a model update request to RAN or CN/OAM, respectively, and CN/OAM or RAN will then provide an updated model to the corresponding network node.

Example A05 includes the method of example A01 and/or some other example(s) herein, wherein the timer is maintained by the network nodes who deploys AI/ML model, and upon the timer is approaching, CN/OAM or RAN will provide an updated model to the RAN or UE, respectively.

Example A06 includes the method of example A01 and/or some other example(s) herein, wherein the timer is maintained by the network nodes who deploys AI/ML model to other network nodes, and the CN/OAM or RAN may trigger model update based on the observed accuracy level.

Example A07 includes the method of example A01 and/or some other example(s) herein, wherein the confidence level is configured by the network nodes who deploys AI/ML model to other network nodes, and the UE or RAN may trigger model update request to RAN or UE.

Example A08 includes the method of example A01 and/or some other example(s) herein, wherein the confidence level is reported by UE or RAN to RAN or CN/OAM, respectively, and the network may update the AI/ML model if confidence level is lower than certain threshold.

Example A09 includes the method of examples A01-A08 and/or some other example(s) herein, wherein the UE or RAN may trigger model update request to RAN or UE.

Example A10 includes the method of examples A01-A09 and/or some other example(s) herein, wherein the UE or RAN reports the performance indicator to RAN or OAM/CN (respectively), indicating performance improvement or down-gradation, and RAN or OAM/CN may send an updated AI/ML model if the performance is downgraded.

Example A11 includes the method of examples A01-A10 and/or some other example(s) herein, wherein the UE or RAN may trigger model update request to RAN or UE based on performance observation of its own.

Example A12 includes the method of example A01 and/or some other example(s) herein, wherein the loss is reported by UE or RAN to RAN or CN/OAM, respectively, and the network may update the AI/ML model if loss is higher than certain threshold.

Example B01 includes a method comprising: triggering an artificial intelligence (AI) and/or machine learning (ML) model update between one or more network nodes in response to one or more trigger conditions.

Example B02 includes the method of example B01 and/or some other example(s) herein, wherein the one or more trigger conditions include expiration of a timer, a accuracy level, a confidence level, performance feedback, and loss of an AI/ML model.

Example B03 includes the method of examples B01-B02 and/or some other example(s) herein, further comprising: sending a message to configure AI/ML model update configuration from a radio access network (RAN) to a user equipment (UE).

Example B04 includes the method of examples B01-B03 and/or some other example(s) herein, further comprising: sending a message to configure AI/ML model update configuration from an operations, administrations, and management function (OAM) and/or core network (CN) to a RAN.

Example B05 includes the method of examples B01-B04 and/or some other example(s) herein, wherein a timer is configured by the one or more network nodes who deploy the AI/ML model to one or more other network nodes.

Example B06 includes the method of example B05 and/or some other example(s) herein, further comprising: as the timer approaches expiration or upon expiration of the timer, sending the AI/ML model update request to a RAN, a CN, or OAM.

Example B07 includes the method of example B06 and/or some other example(s) herein, further comprising: obtaining an updated AI/ML model from the CN, the OAM, or the RAN.

Example B08 includes the method of examples B06-B07 and/or some other example(s) herein, wherein the CN, the OAM, and/or the RAN trigger the AI/ML model update based on an observed accuracy level and/or in response to one or more trigger conditions.

Example B09 includes the method of examples B01-B08 and/or some other example(s) herein, wherein a confidence level is configured by the one or more network nodes who deploy AI/ML model to other network nodes, and a UE or a RAN triggers the AI/ML model update request to the RAN or the UE.

Example B10 includes the method of examples B01-B09 and/or some other example(s) herein, wherein the confidence level is reported by a UE or a RAN to the RAN, the CN, and/or the OAM, and the method comprises: updating the AI/ML model if the confidence level is lower than a threshold confidence level.

Example B11 includes the method of examples B01-B10 and/or some other example(s) herein, wherein the UE or the RAN trigger the AI/ML model update request to the RAN or the UE.

Example B12 includes the method of examples B01-B11 and/or some other example(s) herein, wherein a UE or a RAN reports the performance indicator to the RAN, the CN, and/or the OAM, and the method comprises: indicating performance improvement or down-gradations, and sending or obtaining an updated AI/ML model if the performance is downgraded from the RAN, the CN, and/or the OAM.

Example B13 includes the method of examples B01-B12 and/or some other example(s) herein, wherein the UE or the RAN trigger the AI/ML model update request to the RAN or the UE based on performance observation of its own.

Example B14 includes the method of examples B01-B13 and/or some other example(s) herein, wherein the loss is reported by the UE or the RAN to the RAN, the CN, and/or the OAM, and the method comprises: updating the AI/ML model if the loss is higher than a threshold amount of loss.

Example B15 includes the method of examples B01-B14 and/or some other example(s) herein, wherein the method is performed by a UE, a RAN, a RAN node, a CN function, and/or an OAM.

Example X1 includes an apparatus comprising:

memory to store user equipment (UE) measurement report information; and processing circuitry, coupled with the memory, to:

receive, from a next-generation NodeB (gNB), a request for location information for the UE;

retrieve the UE measurement report information from the memory;

determine, using a positioning artificial intelligence (AI) or machine learning (ML) model, the location information for the UE based on the UE measurement report information and the request for location information, wherein the location information for the UE includes an indication of a predicted location for the UE; and encode a message for transmission to the gNB that includes an indication of the determined location information for the UE.

Example X2 includes the apparatus of example X1 or some other example herein, wherein the UE measurement report information includes historical and current information for the UE.

Example X3 includes the apparatus of example X2 or some other example herein, wherein the historical and current information for the UE includes: location information, speed information, or trajectory information.

Example X4 includes the apparatus of example X1 or some other example herein, wherein the determined location information for the UE includes an indication of a predicted load of the UE.

Example X5 includes the apparatus of example X1 or some other example herein, wherein the determined location information for the UE includes an indication of a current or predicted resource status for a current cell of the UE.

Example X6 includes the apparatus of example X1 or some other example herein, wherein the determined location information for the UE includes an indication of a current or predicted resource status for a target cell of the UE.

Example X7 includes the apparatus of any of examples X1-X6 or some other example herein, wherein the processing circuitry is to implement a network data analytics function (NWDAF), operation administration and maintenance (OAM) function, or location management function (LMF).

Example X8 includes one or more computer-readable media storing instructions that, when executed by one or more processors, cause a network function to:

receive, from a next-generation NodeB (gNB), a request for location information for a user equipment (UE);

determine, using a positioning artificial intelligence (AI) or machine learning (ML) model, the location information for the UE based on UE measurement report information and the request for location information wherein the location information for the UE includes an indication of a predicted location for the UE; and encode a message for transmission to the gNB that includes an indication of the determined location information for the UE.

Example X9 includes the one or more computer-readable media of example X8 or some other example herein, wherein the UE measurement report information includes historical and current information for the UE.

Example X10 includes the one or more computer-readable media of example X9 or some other example herein, wherein the historical and current information for the UE includes: location information, speed information, or trajectory information.

Example X11 includes the one or more computer-readable media of example X8 or some other example herein, wherein the determined location information for the UE includes an indication of a predicted load of the UE.

Example X12 includes the one or more computer-readable media of example X8 or some other example herein, wherein the determined location information for the UE includes an indication of a current or predicted resource status for a current cell of the UE.

Example X13 includes the one or more computer-readable media of example X8 or some other example herein, wherein the determined location information for the UE includes an indication of a current or predicted resource status for a target cell of the UE.

Example X14 includes the one or more computer-readable media of any of examples X8-X13 or some other example herein, wherein the network function includes: a network data analytics function (NWDAF), operation administration and maintenance (OAM) function, or location management function (LMF).

Example X15 includes one or more computer-readable media storing instructions that, when executed by one or more processors, cause a next-generation NodeB (gNB) to:

encode, for transmission to a network function, a request for location information for a user equipment (UE);

receive, from the network function, the location information for the UE, wherein the location information for the UE includes an indication of a predicted location for the UE;

determine configuration information that includes an indication of a combination of candidate handover cells and respective priorities for the candidate handover cells; and encode, for transmission to the UE, a message that includes the configuration information.

Example X16 includes the one or more computer-readable media of example X15 or some other example herein, wherein determining the configuration information includes determining whether the UE should start a handover.

Example X17 includes the one or more computer-readable media of example X15 or some other example herein, wherein the configuration information includes an indication of a target cell from the candidate handover cells to perform a handover, and timing information for performing the handover.

Example X18 includes the one or more computer-readable media of example X15 or some other example herein, wherein the configuration information includes conditional handover (CHO) information.

Example X19 includes the one or more computer-readable media of example X18 or some other example herein, wherein the CHO information includes an indication of conditional handover execution timing.

Example X20 includes the one or more computer-readable media of example X18 or some other example herein, wherein the CHO information includes an indication of timing information for each candidate cell in the combination of candidate handover cells.

Example X21 includes the one or more computer-readable media of examples X15-X20 or some other example herein, wherein the network function includes: a network data analytics function (NWDAF), operation administration and maintenance (OAM) function, or location management function (LMF).

Example Z01 may include an apparatus comprising means to perform one or more elements of a method described in or related to any of examples 1-X21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X21, or any other method or process described herein.

Example Z03 may include an apparatus comprising logic, modules, or circuitry to perform one or more elements of a method described in or related to any of examples 1-X21, or any other method or process described herein.

Example Z04 may include a method, technique, or process as described in or related to any of examples 1-X21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X21, or portions thereof.

Example Z06 may include a signal as described in or related to any of examples 1-X21, or portions or parts thereof.

Example Z07 may include a datagram, packet, frame, segment, protocol data unit (PDU), or message as described in or related to any of examples 1-X21, or portions or parts thereof, or otherwise described in the present disclosure.

Example Z08 may include a signal encoded with data as described in or related to any of examples 1-X21, or portions or parts thereof, or otherwise described in the present disclosure.

Example Z09 may include a signal encoded with a datagram, packet, frame, segment, protocol data unit (PDU), or message as described in or related to any of examples 1-X21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X21, or portions thereof.

Example Z11 may include a computer program comprising instructions, wherein execution of the program by a processing element is to cause the processing element to carry out the method, techniques, or process as described in or related to any of examples 1-X21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |

-continued

| | |
|---|---|
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |

-continued

| | |
|---|---|
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |

-continued

| | |
|---|---|
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |

-continued

| | |
|---|---|
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |

-continued

| | |
|---|---|
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | distributed unit, Next Generation NodeB distributed unit |

-continued

| | |
|---|---|
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |

-continued

| | |
|---|---|
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, |
| IP | Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber |

-continued

| | |
|---|---|
| | authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| | MAC-IMAC used for data integrity of signalling messages (TSG T WG3 context) |

-continued

| | |
|---|---|
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System |

-continued

| | |
|---|---|
| | Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical |

-continued

| | |
|---|---|
| | Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |

| | |
|---|---|
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |

| | |
|---|---|
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, |
| QoS | Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |

-continued

| | |
|---|---|
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |

-continued

| | |
|---|---|
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |

-continued

| | |
|---|---|
| SMTC | SSB-based Measurement Timing Configuration |
| SN | Secondary Node, Sequence Number |
| SoC | System on Chip |
| SON | Self-Organizing Network |
| SpCell | Special Cell |
| | SP-CSI-RNTISemi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| | SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |

-continued

| | |
|---|---|
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |

-continued

| | |
|---|---|
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term “computer system” as used herein refers to any type interconnected electronic devices, computer devices, or components thereof. Additionally, the term “computer system” and/or “system” may refer to various components of a computer that are communicatively coupled with one another. Furthermore, the term “computer system” and/or “system” may refer to multiple computer devices and/or multiple computing systems that are communicatively coupled with one another and configured to share computing and/or networking resources.

The term “appliance,” “computer appliance,” or the like, as used herein refers to a computer device or computer system with program code (e.g., software or firmware) that is specifically designed to provide a specific computing resource. A “virtual appliance” is a virtual machine image to be implemented by a hypervisor-equipped device that virtualizes or emulates a computer appliance or otherwise is dedicated to provide a specific computing resource.

The term “resource” as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A “hardware resource” may refer to compute, storage, and/or network resources provided by physical hardware element(s). A “virtualized resource” may refer to compute, storage, and/or network resources provided by virtualization infrastructure to an application, device, system, etc. The term “network resource” or “communication resource” may refer to resources that are accessible by computer devices/systems via a communications network. The term “system resources” may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term “channel” as used herein refers to any transmission medium, either tangible or intangible, which is used to communicate data or a data stream. The term “channel” may be synonymous with and/or equivalent to “communications channel,” “data communications channel,” “transmission channel,” “data transmission channel,” “access channel,” “data access channel,” “link,” “data link,” “carrier,” “radiofrequency carrier,” and/or any other like term denoting a pathway or medium through which data is communicated. Additionally, the term “link” as used herein refers to a connection between two devices through a RAT for the purpose of transmitting and receiving information.

The terms “instantiate,” “instantiation,” and the like as used herein refers to the creation of an instance. An “instance” also refers to a concrete occurrence of an object, which may occur, for example, during execution of program code.

The terms “coupled,” “communicatively coupled,” along with derivatives thereof are used herein. The term “coupled” may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term “directly coupled” may mean that two or more elements are in direct contact with one another. The term “communicatively coupled” may mean that two or more elements may be in contact with one another by a means of communication including through a wire or other interconnect connection, through a wireless communication channel or link, and/or the like.

The term “information element” refers to a structural element containing one or more fields. The term “field” refers to individual contents of an information element, or a data element that contains content.

The term “SMTC” refers to an SSB-based measurement timing configuration configured by SSB-MeasurementTimingConfiguration.

The term “SSB” refers to an SS/PBCH block.

The term “a “Primary Cell” refers to the MCG cell, operating on the primary frequency, in which the UE either performs the initial connection establishment procedure or initiates the connection re-establishment procedure.

The term “Primary SCG Cell” refers to the SCG cell in which the UE performs random access when performing the Reconfiguration with Sync procedure for DC operation.

The term “Secondary Cell” refers to a cell providing additional radio resources on top of a Special Cell for a UE configured with CA.

The term “Secondary Cell Group” refers to the subset of serving cells comprising the PSCell and zero or more secondary cells for a UE configured with DC.

The term “Serving Cell” refers to the primary cell for a UE in RRC CONNECTED not configured with CA/DC there is only one serving cell comprising of the primary cell.

The term “serving cell” or “serving cells” refers to the set of cells comprising the Special Cell(s) and all secondary cells for a UE in RRC CONNECTED configured with CA/.

The term “Special Cell” refers to the PCell of the MCG or the PSCell of the SCG for DC operation; otherwise, the term “Special Cell” refers to the Pcell.

What is claimed is:

1. An apparatus comprising:

memory to store user equipment (UE) measurement report information; and processing circuitry, coupled with the memory, to:

decode a request for location information for the UE received from a network element;

retrieve the UE measurement report information from the memory;

determine, using a positioning artificial intelligence (AI) or machine learning (ML) model, the location information for the UE based on the UE measurement report information and the request for location information, wherein the location information for the UE includes an indication of a predicted location for the UE; and encode a message, for transmission to the network element, that includes an indication of the location information for the UE, wherein the location information for the UE includes an indication of at least one of a current or predicted resource status for at least one of a current cell of the UE and a target cell of the UE.

2. The apparatus of claim 1, wherein the UE measurement report information includes historical and current information for the UE.

3. The apparatus of claim 2, wherein the historical and current information for the UE includes:

location information, speed information, or trajectory information.

4. The apparatus of claim 1, wherein the location information for the UE includes an indication of a predicted load of the UE.

5. The apparatus of claim 1, wherein the location information for the UE includes the indication of the current or predicted resource status for the current cell of the UE.

6. The apparatus of claim 1, wherein the location information for the UE includes the indication of the current or predicted resource status for the target cell of the UE.

7. The apparatus of claim 1, wherein:

the UE measurement report information includes an indication of a current or predicted speed of the UE and an indication of a current or predicted direction of motion of the UE, and the positioning AI or ML model determines the location information for the UE based on the indication of the current or predicted speed of the UE and the indication of the current or predicted direction of motion of the UE.

8. The apparatus of claim 1, wherein the location information for the UE includes a plurality of predicted locations for the UE corresponding to a plurality of future time points within a requested duration.

9. The apparatus of claim 1, wherein the message encoded for transmission to the network element further includes an indication of an accuracy of the determined location information for the UE.

10. The apparatus of claim 1, wherein:

the processing circuitry is further to update the positioning AI or ML model based on a performance indicator received from a $5^{th}$ generation NodeB (gNB), and the performance indicator indicates a handover outcome for the UE, the handover outcome being successful or unsuccessful.

11. The apparatus of claim 1, wherein:

the request for location information includes a requested duration for the predicted location information, and the requested duration is defined by a start timestamp and an end timestamp or by a start timestamp and a duration parameter.

12. The apparatus of claim 1, wherein the processing circuitry is further configured to select the UE for AI or ML model-based location determination based on at least one of: a number of failed handover executions associated with the UE exceeding a threshold, a speed of the UE being below a threshold speed, or a device type of the UE indicating that the UE operates in an environment in which a trajectory of the UE is predictable.

13. The apparatus of claim 1, wherein:

the processing circuitry is further configured to store in memory the UE measurement report information over a plurality of measurement intervals to build a historical record for the UE, and the positioning AI or ML model is trained based on the historical record.

14. One or more non-transitory computer-readable media storing instructions that, when executed by one or more processors, cause a network function to:

decode a request for location information for a user equipment (UE) received from a network element;

determine, using a positioning artificial intelligence (AI) or machine learning (ML) model, the location information for the UE based on UE measurement report information and the request for location information, wherein the location information for the UE includes an indication of a predicted location for the UE; and encode a message, for transmission to the network element, that includes an indication of the location information for the UE, wherein the location information for the UE includes an indication of at least one of a current or predicted resource status for at least one of a current cell of the UE and a target cell of the UE.

15. The one or more non-transitory computer-readable media of claim 14, wherein the UE measurement report information includes historical and current information for the UE.

16. The one or more non-transitory computer-readable media of claim 15, wherein the historical and current information for the UE includes:

location information, speed information, or trajectory information.

17. The one or more non-transitory computer-readable media of claim 14, wherein the location information for the UE includes an indication of a predicted load of the UE.

18. The one or more non-transitory computer-readable media of claim 14, wherein the location information for the UE includes the indication of the current or predicted resource status for the current cell of the UE.

19. The one or more non-transitory computer-readable media of claim 14, wherein the location information for the UE includes the indication of the current or predicted resource status for the target cell of the UE.

20. The one or more non-transitory computer-readable media of claim 14, wherein the network function includes:

a network data analytics function (NWDAF), operation administration and maintenance (OAM) function, or location management function (LMF).

21. The apparatus of claim 1, wherein the processing circuitry is to implement a network data analytics function (NWDAF), operation administration and maintenance (OAM) function, or location management function (LMF).

* * * * *